(12) United States Patent
Karnick

(10) Patent No.: US 12,158,342 B2
(45) Date of Patent: Dec. 3, 2024

(54) DETERMINING ACCURACY OF SMOOTHED NAVIGATION SOLUTION USING FILTERED RESETS

(71) Applicant: Honeywell International Inc., Charlotte, NC (US)

(72) Inventor: Drew Alan Karnick, Blaine, MN (US)

(73) Assignee: Honeywell International Inc., Charlotte, NC (US)

( * ) Notice: Subject to any disclaimer, the term of this patent is extended or adjusted under 35 U.S.C. 154(b) by 397 days.

(21) Appl. No.: 17/567,689

(22) Filed: Jan. 3, 2022

(65) Prior Publication Data

US 2022/0349714 A1    Nov. 3, 2022

Related U.S. Application Data

(60) Provisional application No. 63/182,549, filed on Apr. 30, 2021.

(51) Int. Cl.
*G01C 21/16* (2006.01)
*B60W 40/12* (2012.01)

(52) U.S. Cl.
CPC ............. *G01C 21/16* (2013.01); *B60W 40/12* (2013.01); *B60W 2554/4041* (2020.02)

(58) Field of Classification Search
CPC ...... G01C 21/16; G01C 21/165; G01C 21/20; B60W 40/12; B60W 2554/4041
See application file for complete search history.

(56) References Cited

U.S. PATENT DOCUMENTS 6,408,245 B1   6/2002  An et al.
6,631,323 B2  10/2003  Tucker et al.
(Continued)

FOREIGN PATENT DOCUMENTS

CN   106643806 B    9/2019
CN   111811512 A   10/2020
(Continued)

OTHER PUBLICATIONS

Weinberg et al., "Multilateration Software Development (phase III)," Air Force Avionics Laboratory (Air Force Systems Command, Sep. 1973), 1-445. (Year: 1973).*

(Continued)

*Primary Examiner* — Daniel M. Robert
(74) *Attorney, Agent, or Firm* — Fogg & Powers LLC

(57) ABSTRACT

Systems and methods for determining accuracy of a smoothed navigation solution using filtered resets are provided. In certain embodiments, a navigation system includes one or more inertial devices configured to detect motion of the system and generate inertial data; and one or more aiding devices configured to generate aiding device measurement data. Further, the navigation system includes one or more processors configured to generate an un-smoothed navigation solution based on the inertial data and the aiding device measurement data, wherein the un-smoothed navigation solution includes an un-smoothed navigation error estimates for a state variable. Further, the one or more processors are configured to calculate a smoothed navigation error estimate for the state variable based on the un-smoothed navigation error estimate. Moreover, the one or more processors are configured to determine whether to provide a smoothed filter reset based on the smoothed navigation error estimate and the un-smoothed navigation solution.

20 Claims, 14 Drawing Sheets

(56) References Cited

U.S. PATENT DOCUMENTS

| | | | |
|---|---|---|---|
| 7,162,367 B2 * | 1/2007 | Lin | G01C 21/28 |
| | | | 701/472 |
| 7,409,289 B2 | 8/2008 | Coatantiec et al. | |
| 10,168,157 B2 | 1/2019 | Buck et al. | |
| 10,634,692 B2 | 4/2020 | Ell | |
| 2009/0093959 A1 | 4/2009 | Scherzinger et al. | |
| 2014/0121963 A1 | 5/2014 | Buck et al. | |
| 2014/0372026 A1 | 12/2014 | Georgy et al. | |
| 2020/0088521 A1 | 3/2020 | Glevarec et al. | |
| 2022/0349714 A1 * | 11/2022 | Karnick | G01C 21/165 |

FOREIGN PATENT DOCUMENTS

| | | |
|---|---|---|
| CN | 109959374 B | 11/2020 |
| CN | 107024226 B | 3/2021 |

OTHER PUBLICATIONS

Finn Haugen, Control Theory (Nov. 3, 2007), 101-239. (Year: 2007).*
Barrie W. Leach, "Low Cost Strapdown Intertial/GPS Integrated navigation for Flight Test Requirements," RTO SCI International Conference, May 1999: 17-1 to 17-12. (Year: 1999).*
Kenneth Gade, "Introduction to Inertial Navigation," FFI, Oct. 1-20, 2009: (Year: 2009).*
European Patent Office, "Extended European Search Report" from EP Application No. 22167572.1, from Foreign Counterpart to U.S. Appl. No. 17/567,689, filed Nov. 2, 2022, pp. 1 through 11, Published: EP.

* cited by examiner

DETERMINING ACCURACY OF SMOOTHED NAVIGATION SOLUTION USING FILTERED RESETS

CROSS-REFERENCE TO RELATED APPLICATION

This application claims the benefit of U.S. Provisional Patent Application Ser. No. 63/182,549 entitled "DETERMINING ACCURACY OF SMOOTHED NAVIGATION SOLUTION USING FILTERED RESETS" filed on Apr. 30, 2021, which is incorporated herein by reference in its entirety.

BACKGROUND

Exemplary navigation systems provide navigation solutions that include position, velocity, and attitude data for objects, including aircraft and other vehicles. Some navigation solutions are based on data from inertial sensors, such as accelerometers measuring linear velocity and gyroscopes measuring angular rates. Inertial measurements from the accelerometers and gyroscopes differ from the actual motion by an error bias, which accumulates over time. Additional measurements from aiding sources (aiding devices or sensors) can be combined with the inertial measurements to limit the accumulated bias errors from the inertial measurements in a navigation solution. For example, measurements received through a GNSS receiver may limit the effects of the inertial bias errors. In particular, a navigation solution can use a Kalman filter to blend the inertial measurements with measurements from a GNSS receiver or other aiding source. While the GNSS measurements are accurate over a long period, the GNSS measurements may also be susceptible to noise. Blending the inertial navigation solution with the GNSS data may leverage the strengths of both measurement sources to compensate for the unique weaknesses of the different measurement sources.

SUMMARY

Systems and methods for determining accuracy of a smoothed navigation solution using filtered resets are provided. In certain embodiments, a navigation system includes one or more inertial devices configured to detect motion of the system and generate inertial data. The navigation system also includes one or more aiding devices configured to generate aiding device measurement data. Further, the navigation system includes one or more processors configured to generate an un-smoothed navigation solution based on the inertial data and the aiding device measurement data, wherein the un-smoothed navigation solution includes an un-smoothed navigation error estimates for a state variable. Further, the one or more processors are configured to calculate a smoothed navigation error estimate for the state variable based on the un-smoothed navigation error estimate. Moreover, the one or more processors are configured to determine whether to provide a smoothed filter reset based on the smoothed navigation error estimate and the un-smoothed navigation solution.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Figure 1A:
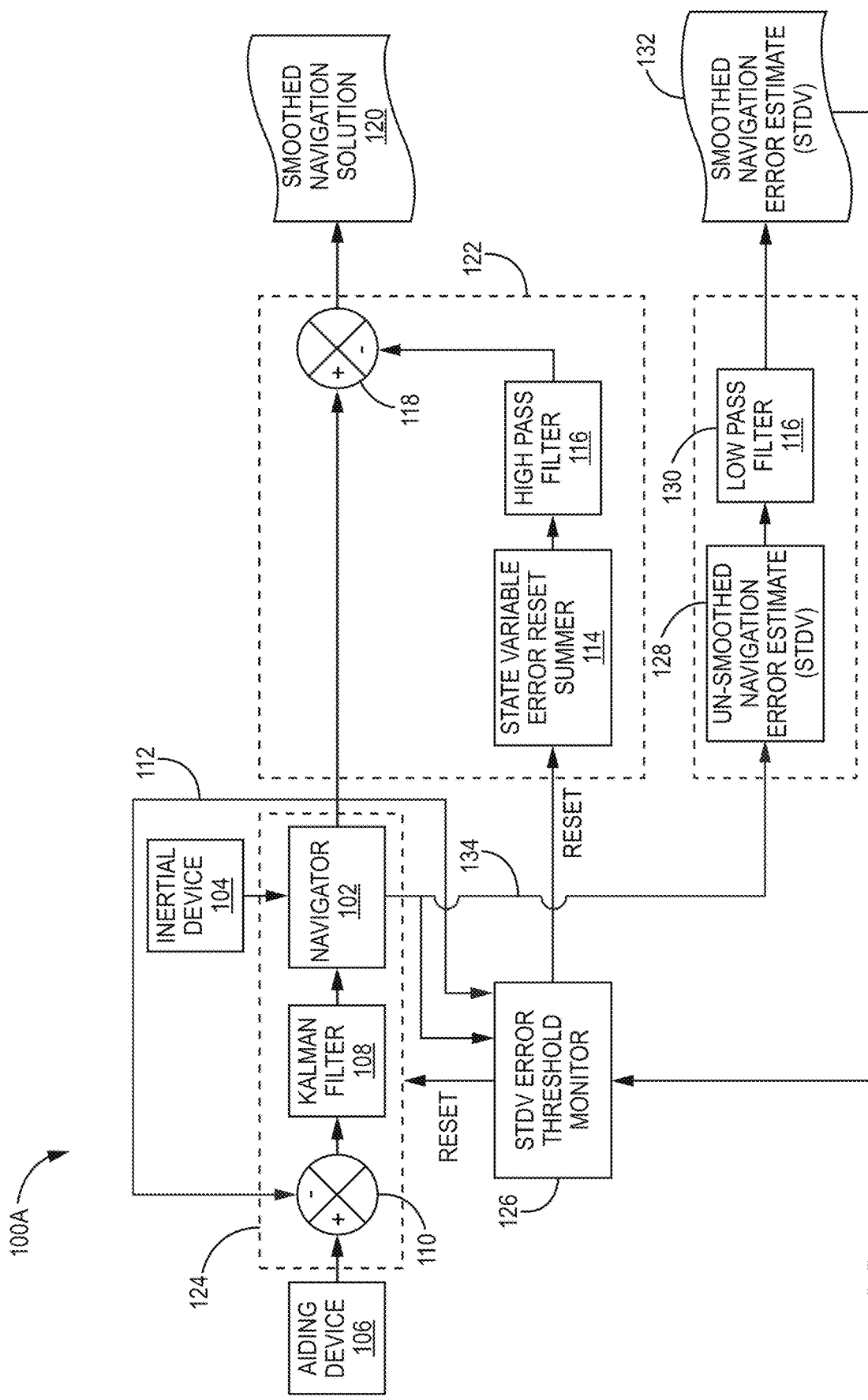
FIGS. 1A-1C are block diagrams depicting exemplary embodiments of navigation systems according to an aspect of the present disclosure.

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific, illustrative embodiments. However, it is to be understood that other embodiments may be used and that logical, mechanical, and electrical changes may be made.

The present disclosure describes systems and methods for determining the accuracy of smoothed navigation solutions using filtered resets. In particular, systems and methods described herein provide estimates of a smoothed filter output accuracy, provide the estimates as an output, and include logic for resetting the calculations by the navigation filter.

During the operation of some navigation systems, the navigation systems may calculate a navigation solution using onboard inertial sensors. The navigation system subsequently receives a GNSS signal upon acquisition of GNSS signals. Upon acquisition of the GNSS signals, the navigation solution may have significant errors. The navigation system may reset the navigation solution quickly upon acquisition of the GNSS signals. At times, the GNSS receiver may not acquire signals until the vehicle is moving and, with aircraft, maybe not until the vehicle is in the air. In some systems, the system waits until the Kalman filter receives the GNSS signals. However, in systems where the navigation system provides the navigation solution as feedback to the GNSS receiver, the GNSS receiver could see significant step-changes in the data in the navigation solution, such as velocities, positions, and the like. Because of the high bandwidth of GNSS receivers (and other aiding devices), the loops inside the GNSS receiver could lose track due to these step changes in the navigation solution. If the loops within the GNSS receiver lose track, the data provided by the GNSS receiver is no longer reliable, leading the navigation systems to reject the data in the GNSS signals. For example, a satellite signal tracking loops inside the GNSS receiver could lose lock with jumps in positions greater than about 40 meters or step changes in velocity greater than about 5-10 meters per second. In other embodiments, the loops inside an aiding device could lose lock with greater or smaller changes based on different sensitivities to step changes in the information fed back to the aiding device.

Embodiments of systems and methods described herein provide a reset circuit that reduces the recovery time from resets of the navigation solution while improving the accuracy of the navigation solution after GNSS outages. Additionally, the systems and methods for determining the accuracy of smoothed navigation solutions using filtered resets provides information about the accuracy of the produced smoothed variables. With the information about the accuracy, systems and methods described herein can make decisions regarding the resetting of Kalman filters and navigation solutions based on the smoothed filter outputs.

Figure 1B:
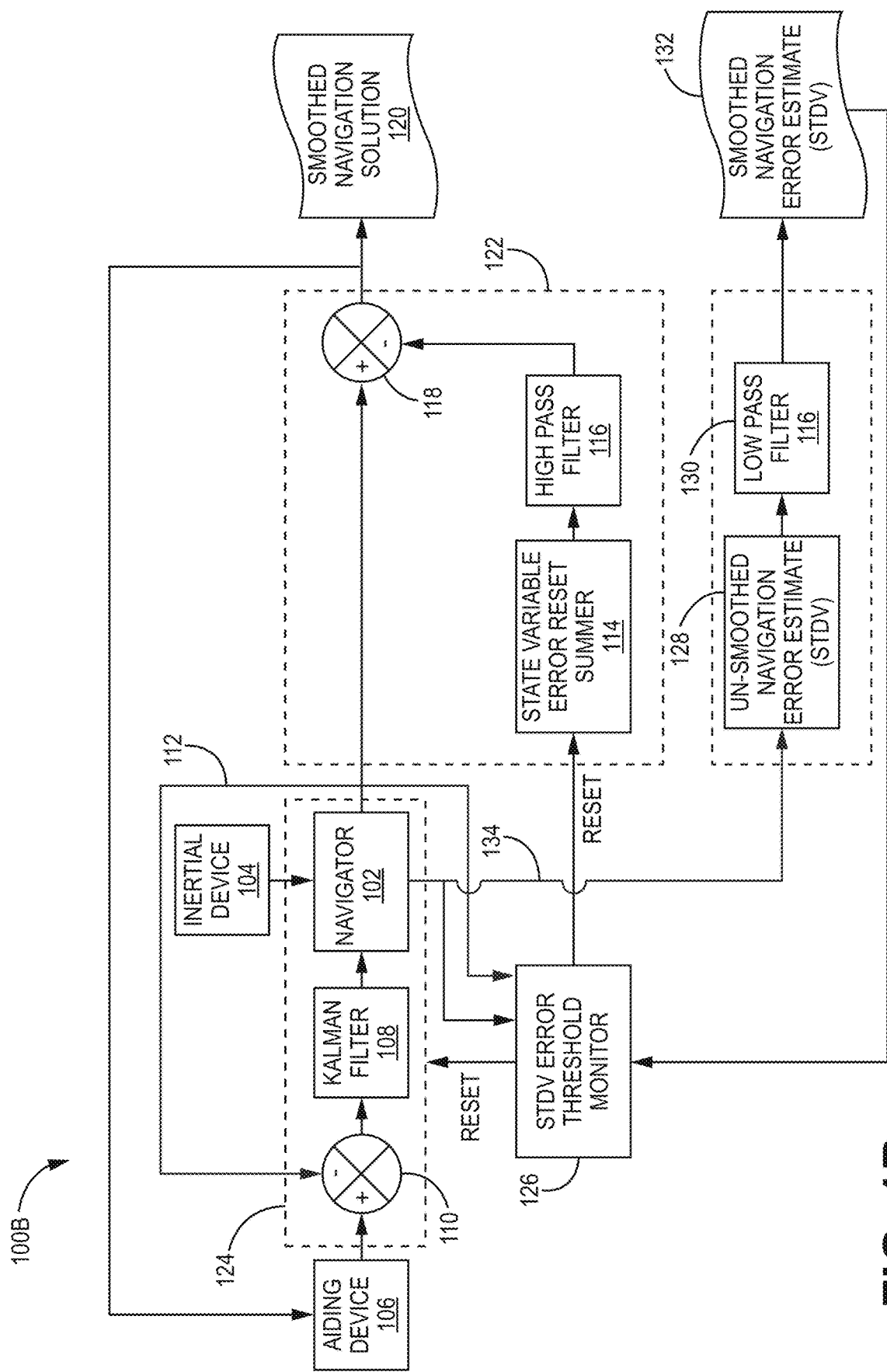
Figure 1C:
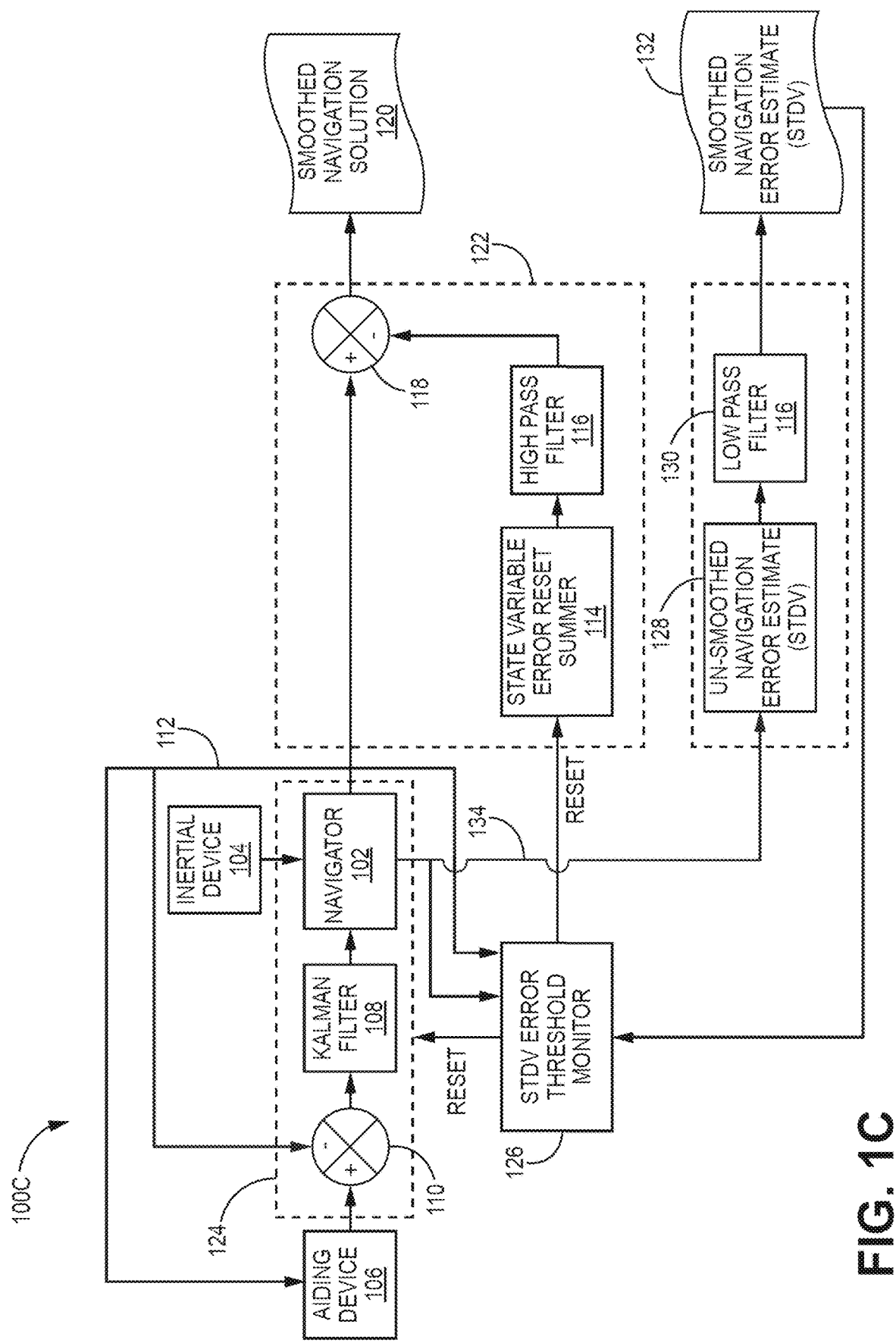

FIGS. 1A-1C are block diagrams depicting exemplary embodiments of navigation systems 100. While any of navigation systems 100 may be implemented on aircraft (including jets, planes, helicopters, blimps, and balloons), they can also be implemented onboard other vehicles, such as space vehicles, trains, sea vessels (including ships and submersibles), missiles, rockets, and other ballistics and projectiles. The navigation systems 100 may include integrated into systems worn by individuals on the ground, in structures, in caverns, in air, on or in water, or in space. The navigation systems 100 may be integrated into buildings, other structures, caverns, or integrated in other ways and for other uses. Each of FIGS. 1A-1C illustrates a different embodiment of a potential navigation system 100, where the potential navigation systems 100 are respectively labeled 100A-100C.

FIG. 1A is a block diagram depicting an exemplary embodiment of a navigation system 100A. Navigation system 100A includes a navigator 102, one or more inertial devices 104, one or more aiding devices 106 (including aiding devices of different types), a Kalman filter 108, a summer 110, an optional output of an un-smoothed navigation solution 112, a state variable error reset summer 114, a high-pass filter 116, a summer 118, an output of a smoothed navigation solution 120, a standard deviation (STDV) error threshold monitor 126, an un-smoothed navigation error estimate 128, a low-pass filter 130, a smoothed STDV navigation error estimate 132, and an optional output of an un-smoothed STDV navigation error estimate 134. The state variable error reset summer 114, high-pass filter 116, and summer 118 can be integrated as components of an optional navigation solution smoothing function 122. Similarly, the navigator 102, Kalman filter 108, and summer 110 can be integrated as components of an optional navigation solution generation function 124.

In exemplary embodiments, the aiding device 106 is configured to receive signals or acquire information related to one or more of the position (sometimes referred to as location), velocity, orientation (including attitude data that includes at least one of roll, pitch, and heading), and other types of measurements for a moving object associated with the navigation system 100A. The aiding device 106 generates aiding device measurement data from the acquired information that the navigation system 100A can use to calculate a navigation solution, where the navigation solution describes one or more state variables for an object associated with the navigation solution. As used herein, a state variable is a measurement that describes an aspect of the current navigational state of the object. For example, a state variable may describe altitude, velocity, latitude/longitude, attitude, position, and the like. In some implementations, the aiding device 106 includes one or more of a global navigation satellite system (GNSS) receiver, a magnetometer, a pressure sensor, a master inertial navigation system, a Doppler radar receiver, Long Range Navigation (LORAN) based positioning receiver, and the like.

In further embodiments, the aiding device 106 supplies the aiding device measurement data to the summer 110. The summer 110 receives the aiding device measurement data (such as position, velocity, attitude, or orientation) from the aiding device 106 and a previous un-smoothed navigation solution 112 from the navigator 102. The aiding device measurement data includes position measurements from a GNSS receiver or LORAN receiver, velocity measurements from a Doppler radar, orientation (or heading) measurements from a compass or magnetometer, and the like. The summer 110 subtracts the previous un-smoothed navigation solution 112 from the aiding device measurement data to determine error measurements between the aiding device measurement data supplied by the aiding device 106 and the previously calculated un-smoothed navigation solution 112. In exemplary embodiments, the error measurements include errors between position measurements of the aiding device measurement data and position solutions of the previously calculated un-smoothed navigation solution 112, errors between velocity measurements of the aiding device measurement data and velocity solutions of the previously calculated un-smoothed navigation solution 112, or errors between orientation measurements of the aiding device measurement data and orientation solutions of the previously calculated un-smoothed navigation solution.

In exemplary embodiments, the Kalman filter 108 can receive the error measurements from the summer 110 and generate state variable error resets based on the error measurements between the aiding device measurement data supplied by the aiding device 106 and the previously calculated un-smoothed navigation solution 112. In exemplary embodiments, the state variable error resets include one or more of a velocity error reset, an altitude error reset, a latitude and longitude error reset, and an attitude error reset. In some implementations, the state variable error resets are most significant when the aiding device 106 first starts producing some aiding device measurement data, such as when a GNSS receiver aiding device first acquires (or re-acquires) GNSS data by locking onto enough satellites to produce position data. At times, this may occur soon after starting up the aiding device 106 or after a power cycle during operation. In other embodiments, the state variable error resets are generated when the aiding device 106 starts producing data, such as when a GNSS receiver aiding device acquires (or re-acquires) GNSS data by locking onto enough satellites to produce position data.

The inertial device 104 is configured to detect the motion of the navigation system 100A and to generate inertial data regarding the motion of the navigation system 100A. In exemplary embodiments, the inertial device 104 includes any combination of gyroscopes and accelerometers that detect linear or rotational motion. In exemplary embodiments, the inertial device 104 is an inertial measurement unit (IMU), other combination of inertial sensors, or an individual inertial sensor. The navigator 102 is configured to receive inertial data from the inertial device 104, and the state variable error resets from the Kalman filter 108. The navigator 102 is configured to calculate the un-smoothed navigation solution 112 based on the inertial data received from the inertial device 104 and the state variable error resets received from the Kalman filter 108, the un-smoothed navigation solution 112 inclusive of the navigation state error estimates.

In exemplary embodiments, the state variable error reset summer 114 is configured to receive state variable error resets and sum the state variable error resets into a cumulative sum of state variable error resets. In exemplary embodiments, the state variable error reset summer 114 is configured to receive state variable error resets from an STDV error threshold monitor, as shown in FIG. 1A. In other embodiments, these state variable resets may be received from the navigator 102. The state variable error resets include at least one of a velocity error reset, an altitude error reset, a latitude and longitude error reset, and an attitude error reset. In exemplary embodiments, the different types of state variable error resets are summed independently of each other to create various cumulative sums of state variable error resets. In exemplary embodiments, the state variable error reset summer 114 includes at least one of a velocity error reset summer, an attitude error reset summer, a latitude and longitude error reset summer, and an altitude error reset summer. In exemplary embodiments, the state variable error reset summer 114 or any of the individual velocity error reset summer, altitude error reset summer, latitude and longitude error reset summer, and attitude error reset summer generate at least one of a cumulative sum of velocity error resets, a cumulative sum of altitude error resets, a cumulative sum of latitude and longitude error resets, and a cumulative sum of attitude error resets.

In exemplary embodiments, the high-pass filter 116 is configured to receive and filter the cumulative sum of state variable error resets from the state variable error reset summer 114. In exemplary embodiments, the high-pass filter 116 filters out the low frequency data that is changing slowly (and is not likely to be part of a step change in the un-smoothed navigation solution 112), leaving the information that is changing rapidly (that is likely to be a part of one or more step changes to the un-smoothed navigation solution 112). Thus, the high-pass filter 116 allows the state variable error resets that are changing rapidly to pass through and filters out the state variable error resets that are not changing rapidly. In exemplary embodiments, the high-pass filter includes various sub-filters to high-pass filter any individual types of cumulative state variable error resets, including a cumulative sum of velocity error resets, a cumulative sum of altitude error resets, a cumulative sum of latitude and longitude error resets, and a cumulative sum of attitude error resets.

In exemplary embodiments, the summer 118 is configured to subtract the high-pass filtered cumulative sum of the variable error resets from the un-smoothed navigation solution 112 to generate the smoothed navigation solution 120. The previous high-pass filtering of the cumulative sum of the variable error resets isolated the effects of the error resets that should be removed from the un-smoothed navigation solution 112 to mitigate the step change present in the un-smoothed navigation solution 112. Thus, the smoothed navigation solution 120 does not include the fast-changing data caused by the resets present in the un-smoothed navigation solution 112, and the smoothed navigation solution 120 does not have large step changes. Still, with filtering of the resets, the smoothed navigation solution 120 (that responds more gradually to the state variable error resets) eventually converges with the un-smoothed navigation solution 112 (that responds more quickly to the state variable error resets).

In exemplary embodiments, the summer 118 includes a plurality of components that subtract the different components of variable error resets from the corresponding components of the un-smoothed navigation solution 112. For example, in some embodiments, various components of the summer 118 subtract the different components of variable error resets from the corresponding components of the un-smoothed navigation solution 112 to generate various components of the smoothed navigation solution 120, including subtracting at least one of the cumulative sum of velocity error resets from the velocity component of the un-smoothed navigation solution 112 to generate the velocity component of the smoothed navigation solution 120, the cumulative sum of altitude error resets from the altitude component of the un-smoothed navigation solution 112 to generate the altitude component of the smoothed navigation solution 120, the cumulative sum of latitude and longitude error resets from the latitude and longitude component of the un-smoothed navigation solution 112 to generate the latitude and longitude component of the smoothed navigation solution 120, and the cumulative sum of attitude error resets from the attitude component of the un-smoothed navigation solution 112 to generate the attitude component of the smoothed navigation solution 120.

Un-smoothed navigation solution 112 and smoothed navigation solution 120 generated by the navigation system 100A may include any type of navigation solution, including a velocity solution, an altitude solution, a latitude and longitude solution, and an attitude solution and any combinations or derivatives thereof. These various solutions describe the solution for various state variables. For example, the navigation solution may describe a velocity state, an altitude state, a latitude/longitude state, an attitude state, and the like. In exemplary embodiments, the un-smoothed navigation solution 112 and the smoothed navigation solution 120 include a single type of navigation solution. In other exemplary embodiments, the un-smoothed navigation solution 112 and the smoothed navigation solution 120 include a plurality of types of navigation solutions.

The navigation system 100A described above has the advantages of providing the smoothed navigation solution 120 while reducing the phase delay introduced by the filtering. The reduction of phase delay is enabled by filtering out the high-frequency state variable error resets from the un-smoothed navigation solution 112 without filtering the entire un-smoothed navigation solution 112. Accordingly, the abrupt step changes or resets in the Kalman filtered solution are filtered out in the smoothed navigation solution 120 while other dynamics measured by the navigation system 100A are not delayed or have a phase delay associated with them. The filtering of the abrupt step changes while leaving other dynamics enables the smoothed navigation solution 120 generated by the navigation system 100A to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed navigation solution 120 is used with a vehicle's autopilot system to smooth out the autopilot's response to changes in the navigation solution. Using the smoothed navigation solution enables the autopilot to accurately respond to changes or corrections in the navigation solution data without commanding a vehicle to perform an abrupt maneuver. In additional implementations, another system uses the smoothed navigation solution 120 to control where a seeker is pointed or to help steer a GNSS receiver to better track GNSS signals. In exemplary embodiments, the speed at which the smoothed navigation solution 120 converges to the un-smoothed navigation solution can be adjusted by a user.

In additional embodiments, the navigation system 100A includes an STDV error threshold monitor 126. The STDV error threshold monitor 126 receives various inputs and performs at least one reset logic for the particular state variables. In some implementations, the STDV error threshold monitor 126 performs a smoothed filter reset logic that determines if an associated state variable has exceeded an accuracy threshold. For example, if the accuracy (such as the standard deviation) exceeds a threshold value, the STDV error threshold monitor 126 may provide a smoothed filter reset to the state variable error reset summer 114. The state variable error reset summer 114 sums the received resets as described above.

In additional embodiments, the STDV error threshold monitor 126 performs a second reset logic that determines whether the Kalman filter 108 (or other applied navigation filter) is likely in an invalid operating state and should receive an un-smoothed navigation solution filter reset. For example, an outage from GNSS signals may be substantially extended such that the Kalman filter 108 is likely not in a valid operating state. When the Kalman filter 108 receives an un-smoothed navigation solution filter reset, the Kalman filter 108 may re-initialize operation upon the reception of GNSS signals.

In some embodiments, the STDV error threshold monitor 126 performs the reset logic based on received inputs. A first input is the un-smoothed navigation solution 112 described above, and a second input is the smoothed navigation error estimate 132. Optionally, the STDV error threshold monitor 126 may perform the reset logic using the un-smoothed STDV navigation error estimate 134 as an additional input. The STDV error threshold monitor 126 compares the accuracy estimate against a threshold for the accuracy of a state variable and determines whether the accuracy exceeds the threshold. Further, based on the determination, the STDV error threshold monitor 126 uses the inputs to compare the accuracy of a particular state variable against a threshold when determining whether to provide a smoothed filter reset to the state variable error reset summer 114. Additionally, the STDV error threshold monitor 126 uses the un-smoothed navigation solution 112 and the smoothed STDV navigation error estimate 132 to determine whether the Kalman filter 108 is in a valid operating state.

As stated above, the STDV error threshold monitor 126 receives a smoothed STDV navigation error estimate 132 and compares the smoothed STDV navigation error estimate 132 against a threshold. The smoothed STDV navigation error estimate 132 is an estimate of the accuracy for a particular state variable. The navigation system 100A may calculate the smoothed STDV navigation error estimate 132 using various methods. For example, the navigation system 100A may calculate an un-smoothed navigation error estimate 128 as a standard deviation for the state variable. After calculating the un-smoothed navigation error estimate 128, the navigation system 100A may include a low pass filter 130. The low-pass filter 130 may filter out high-frequency state variable STDV error estimates from the un-smoothed navigation error estimates 128 to create the smoothed STDV navigation error estimate 132. The low-pass filter 130 may be designed to be a −3 db frequency and be nominally related to the filtered frequency of the high-pass filter 116.

In additional embodiments, the un-smoothed navigation error estimate 128 may be adjusted to a scheduled gain approach that reflects whether the navigation system 100A is receiving GNSS signals or receiving GNSS signals in a degraded accuracy state relative to the intended state for the smoothed filter. For example, if the intended operational state were real time kinematics (RTK), there would be different gains associated with free inertial, Inertial+Stand Alone, Inertial+SBAS, and Inertial+RTK Float, gains could be calculated through a Monte Carlo approach (simulate using known recording outage situations) given that a deterministic approach would be complex. In some embodiments, the navigation system 100A may use a combination of the low pass filtering and the scheduled gain approach.

FIG. 1B is a block diagram depicting an exemplary embodiment of a navigation system 100B. The navigation system 100B includes a navigator 102, an inertial device 104, an aiding device 106, a Kalman filter 108, a summer 110, an optional output of the un-smoothed navigation solution 112, a state variable error reset summer 114, a high-pass filter 116, a summer 118, an output of the smoothed navigation solution 120, an STDV error threshold monitor 126, an un-smoothed navigation error estimate 128, a low-pass filter 130, a smoothed STDV navigation error estimate 132, and a optional output of an un-smoothed STDV navigation error estimate 134. The state variable error reset summer 114, high-pass filter 116, and summer 118 can be integrated as components of the optional navigation solution smoothing function 122. Similarly, the navigator 102, Kalman filter 108, and summer 110 can be integrated as components of the optional navigation solution generation function 124. The navigation system 100B includes similar components to navigation system 100A and operates according to similar principles and methods as navigation system 100A described above. The difference between navigation system 100B and navigation system 100A is that navigation system 100B includes feedback of the smoothed navigation solution 120 to the aiding device 106.

In exemplary embodiments, the aiding device 106 is configured to receive the smoothed navigation solution 120 and to use the smoothed navigation solution 120 to aid in generating aiding device measurement data based on the position of the system. In exemplary embodiments, the aiding device 106 may use the smoothed navigation solution 120 to reduce the chance of the aiding device 106 losing lock within its loops based on a step change present in the un-smoothed navigation solution 112.

FIG. 1C is a block diagram depicting an exemplary embodiment of a navigation system 100C. Navigation system 100C includes a navigator 102, an inertial device 104, an aiding device 106, a Kalman filter 108, a summer 110, an optional output of the un-smoothed navigation solution 112, a state variable error reset summer 114, a high-pass filter 116, a summer 118, an output of the smoothed navigation solution 120, an STDV error threshold monitor 126, an un-smoothed navigation error estimate 128, a low-pass filter 130, a smoothed STDV navigation error estimate 132, and an optional output of an un-smoothed STDV navigation error estimate 134. The state variable error reset summer 114, high-pass filter 116, and summer 118 can be integrated as components of the optional navigation solution smoothing function 122. Similarly, the navigator 102, Kalman filter 108, and summer 110 can be integrated as components of the optional navigation solution generation function 124. The navigation system 100C includes similar components to the navigation system 100A and operates according to similar principles and methods as the navigation system 100A described above. The difference between the navigation system 100C and the navigation system 100A is that the navigation system 100C includes feedback of the un-smoothed navigation solution 112 to the aiding device 106.

In exemplary embodiments, the aiding device 106 is configured to receive the un-smoothed navigation solution 112 and to use the un-smoothed navigation solution 112 to aid in generating aiding device measurement data based on the position of the system. In exemplary embodiments, using the un-smoothed navigation solution 112 instead of the smoothed navigation solution 120 by the aiding device 106 may not as effectively reduce the chance that the aiding device 106 loses lock within its loops based on a step change present in the un-smoothed navigation solution 112.

FIGS. 2A-2E are block diagrams depicting exemplary embodiments of optional navigation solution smoothing function 122 for any of the navigation systems 100A-100C. Each of FIGS. 2A-2E illustrates a different embodiment of the navigation solution smoothing function 122, labeled 122A-122E, respectively.

Figure 2A:
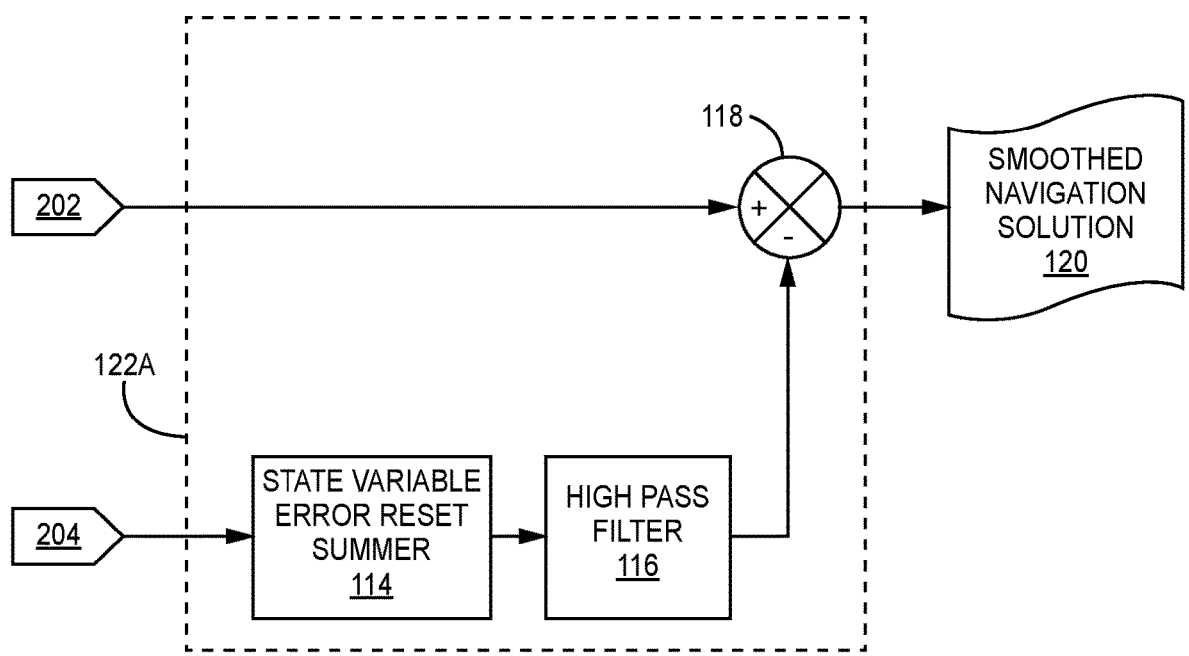
FIGS. 2A-2E are block diagrams depicting exemplary embodiments of navigation solution smoothing functions of the navigation systems shown in FIGS. 1A-1C according to an aspect of the present disclosure.

FIG. 2A is a block diagram depicting an exemplary embodiment of a navigation solution smoothing function 122A. Navigation solution smoothing function 122A is configured to receive an un-smoothed navigation solution 112 as a first input 202 and state variable error resets as a second input 204 from an associated STDV error threshold monitor 126 and generates a smoothed navigation solution 120. Specifically, the navigation solution smoothing function 122A includes the state variable error reset summer 114, high-pass filter 116, and summer 118. The navigation solution smoothing function 122A provides the smoothed navigation solution 120 as an output. The state variable error reset summer 114 is configured to receive state variable error resets from the STDV error threshold monitor 126 through the input 204 and to sum the state variable error resets into a cumulative sum of state variable error resets. In exemplary embodiments, the state variable error reset summer 114 also receives state variable error resets through the second input 204 from a Kalman filter, such as the Kalman filter 108 shown in FIG. 1B. In other embodiments, the state variable error reset summer 114 is configured to receive variable error resets from sources other than the STDV error threshold monitor 126.

In exemplary embodiments, the state variable error resets include at least one of a velocity error reset, an altitude error reset, a latitude and longitude error reset, and an attitude error reset. In exemplary embodiments, the different types of state variable error resets are summed independently of each other to create various cumulative sums of state variable error resets. In exemplary embodiments, the state variable error reset summer 114 includes at least one of a velocity error reset summer, an altitude error reset summer, a latitude and longitude error reset summer, and an attitude error reset summer (such as those summers described below with reference to FIGS. 2B-2E). In exemplary embodiments, the state variable error reset summer 114 or any of the individual velocity error reset summer, altitude error reset summer, latitude and longitude error reset summer, and attitude error reset summer generate at least one of a cumulative sum of velocity error resets, a cumulative sum of altitude error resets, a cumulative sum of latitude and longitude error resets, and a cumulative sum of attitude error resets.

In exemplary embodiments, the high-pass filter 116 is configured to receive the cumulative sum of state variable error resets from the state variable error reset summer 114 and high-pass filters them. In exemplary embodiments, the high-pass filter 116 filters out the low frequency data that is changing slowly (and is not likely to be part of a step change in the un-smoothed navigation solution 112), leaving the information that is changing rapidly (that is likely to be a part of one or more step changes to the un-smoothed navigation solution 112). Thus, the high-pass filter 116 allows the state variable error resets that are changing rapidly to pass through and filters out the state variable error resets that are not changing rapidly. In exemplary embodiments, the high-pass filter includes various sub-filters to high-pass filter any individual types of cumulative state variable error resets, including a cumulative sum of velocity error resets, a cumulative sum of altitude error resets, a cumulative sum of latitude and longitude error resets, and a cumulative sum of attitude error resets (such as those sub-filters described below with reference to FIGS. 2B-2E).

In exemplary embodiments, the summer 118 is configured to subtract the high-pass filtered cumulative sum of the variable error resets from the un-smoothed navigation solution 112 to generate the smoothed navigation solution 120. The previous high-pass filtering of the cumulative sum of the variable error resets isolated the effects of the error resets that should be removed from the smoothed navigation solution 120 to mitigate the step change present in the un-smoothed navigation solution 112. In exemplary embodiments, the summer 118 includes a plurality of components that subtract the different components of variable error resets from the corresponding components of the un-smoothed navigation solution 112. For example, in some embodiments, various components of the summer 118 subtract the different components of variable error resets from the corresponding components of the un-smoothed navigation solution 112 to generate various components of the smoothed navigation solution 120, including subtracting at least one of the cumulative sum of velocity error resets from the velocity component of the un-smoothed navigation solution 112 to generate the velocity component of the smoothed navigation solution 120, the cumulative sum of altitude error resets from the altitude component of the un-smoothed navigation solution 112 to generate the altitude component of the smoothed navigation solution 120, the cumulative sum of latitude and longitude error resets from the latitude and longitude component of the un-smoothed navigation solution 112 to generate the latitude and longitude component of the smoothed navigation solution 120, and the cumulative sum of attitude error resets from the attitude component of the un-smoothed navigation solution 112 to generate the velocity component of the smoothed navigation solution 120.

The un-smoothed navigation solution 112 and the smoothed navigation solution 120 generated by the navigation solution smoothing function 122A may include different types of navigation solutions, including a velocity solution, an altitude solution, a latitude and longitude solution, and an attitude solution, or combinations or derivatives thereof (such as the solutions described below with reference to FIGS. 2B-2E). In exemplary embodiments, the smoothed navigation solution 120 includes a single type of navigation solution (such as one of the types of solutions described below in FIGS. 2B-2E). In other exemplary embodiments, the smoothed navigation solution 120 includes a plurality of types of navigation solutions (such as any of the types of solutions described below with reference to FIGS. 2B-2E).

The navigation solution smoothing function 122A described above has the advantages of providing the smoothed navigation solution 120 while reducing the phase delay introduced by the filtering. Providing the smoothed navigation solution 120 with reduced phase delay is enabled by filtering out the high-frequency state variable error resets from the un-smoothed navigation solution 112 without filtering the entire un-smoothed navigation solution 112. Accordingly, only the abrupt step changes or resets in the Kalman filtered solution are filtered out in the smoothed navigation solution 120, while there are other dynamics of the movement of the navigation solution smoothing function 122A that may not be delayed or have a phase delay associated with them. The non-delayed dynamics may enable the smoothed navigation solution 120, generated by the navigation solution smoothing function 122A, to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed navigation solution 120 is used with a vehicle's autopilot system to smooth out the autopilot's response to changes in the navigation solution. Using the smoothed navigation solution 120 enables the autopilot to accurately respond to changes or corrections in the navigation solution data without commanding a vehicle to perform an abrupt maneuver. In exemplary embodiments, the smoothed navigation solution 120 is used to control where a seeker is pointed or help steer a GNSS receiver to track GNSS signals. In exemplary embodiments, the speed at which the smoothed navigation solution 120 converges to the un-smoothed navigation solution can be adjusted by a user.

Figure 2B:
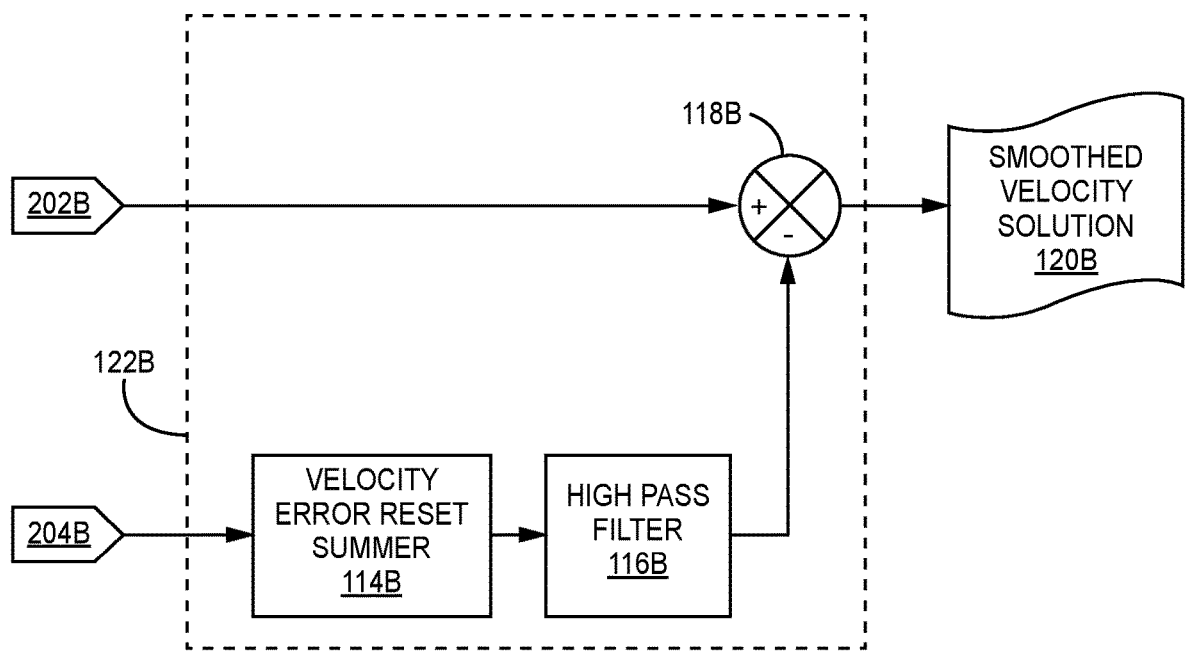

FIG. 2B is a block diagram depicting an exemplary embodiment of a velocity solution smoothing function 122B focused on generating a smoothed velocity solution 120B. Velocity solution smoothing function 122B is configured to receive an un-smoothed velocity solution as a first input 202B and velocity error resets as a second input 204B from an associated STDV error threshold monitor 126 and is configured to generate the smoothed velocity solution 120B. The unsmoothed velocity solution may be included in the un-smoothed navigation solution 112 described above. Similarly, the velocity error resets may be included in state variable error resets received from a Kalman filter or another source as described above. Velocity solution smoothing function 122B includes velocity error reset summer 114B, high-pass filter 116B, summer 118B, and output of the smoothed velocity solution 120B. Velocity error reset summer 114B is configured to receive velocity error resets from the second input 204B and to sum the velocity error resets into a cumulative sum of velocity error resets.

In exemplary embodiments, the high-pass filter 116B is configured to receive the cumulative sum of velocity error resets from the velocity error reset summer 114B, and high-pass filters the cumulative sum. In exemplary embodiments, the high-pass filter 116B filters out the low frequency data from the cumulative sum of velocity error resets that is changing slowly (and is not likely to be part of a step change in the un-smoothed velocity solution 112B), leaving the information that is changing rapidly (that is likely to be a part of one or more step changes to the un-smoothed velocity solution 112B). In exemplary embodiments, the summer 118B is configured to subtract the high-pass filtered cumulative sum of the velocity error resets from the un-smoothed velocity solution received from first input 202B to generate the smoothed velocity solution 120B. The previous high-pass filtering of the cumulative sum of the velocity error resets isolated the effects of the velocity error resets that should be removed from the smoothed velocity solution 120B to mitigate the step change in velocity that is present in the un-smoothed velocity solution.

The velocity solution smoothing function 122B described above has the advantages of providing the smoothed velocity solution 120B while reducing the phase delay introduced by the filtering. The smoothing function is enabled by filtering out the high-frequency velocity error resets from the un-smoothed velocity solution 112B without filtering the entire un-smoothed velocity solution 112B. Accordingly, only the abrupt step changes or resets in the Kalman filtered solution are filtered out in the smoothed velocity solution 120B, while there are other dynamics of the velocity of the navigation system that are not delayed or have a phase delay associated with them. Allowing the other dynamics enables the smoothed velocity solution 120B generated by the velocity solution smoothing function 122B to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed velocity solution 120B is used with a vehicle's autopilot system to smooth out the autopilot's response to changes in the navigation solution. Using the smoothed velocity solution 120B enables the autopilot to accurately respond to changes or corrections in the velocity solution data without commanding a vehicle to perform an abrupt maneuver. In exemplary embodiments, the smoothed velocity solution 120B is used to control where a seeker is pointed or help steer a GNSS receiver to track GNSS signals better. In exemplary embodiments, the speed at which the smoothed velocity solution 120B converges to the un-smoothed velocity solution 112B can be adjusted by a user.

Figure 2C:
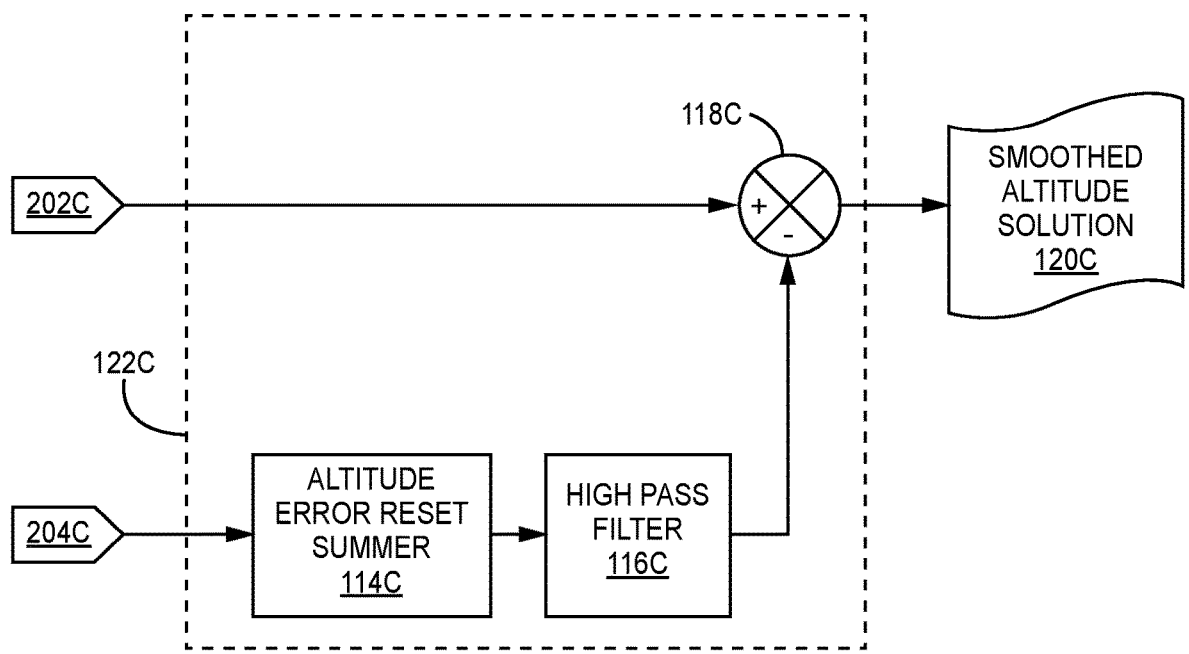

FIG. 2C is a block diagram depicting an exemplary embodiment of an altitude solution smoothing function 122C focused on generating a smoothed altitude solution 120C. Altitude solution smoothing function 122C is configured to receive an un-smoothed altitude solution as a first input 202C and altitude error resets as a second input 204C from an STDV error threshold monitor 126 and is configured to generate the smoothed altitude solution 120C. The unsmoothed altitude solution may be included in the un-smoothed navigation solution 112 described above. Similarly, the altitude error resets may be included in state variable error resets received from a Kalman filter or another source as described above. Altitude solution smoothing function 122C includes altitude error reset summer 114C, high-pass filter 116C, summer 118C, and output of the smoothed altitude solution 120C. Altitude error reset summer 114C is configured to receive altitude error resets from the second input 204C and to sum the altitude error resets into a cumulative sum of altitude error resets.

In exemplary embodiments, the high-pass filter 116C is configured to receive the cumulative sum of altitude error resets from the altitude error reset summer 114C and high-pass filters the cumulative sum. In exemplary embodiments, the high-pass filter 116C filters out the low frequency data from the cumulative sum of altitude error resets that is changing slowly (and is not likely to be part of a step change in the un-smoothed altitude solution 112C), leaving the information that is changing rapidly (that is likely to be a part of one or more step changes to the un-smoothed altitude solution 112C). In exemplary embodiments, the summer 118C is configured to subtract the high-pass filtered cumulative sum of the altitude error resets from the un-smoothed altitude solution received from the first input 202C to generate the smoothed altitude solution 120C. The previous high-pass filtering of the cumulative sum of the altitude error resets isolated the effects of the altitude error resets that should be removed from the smoothed altitude solution 120C to mitigate the step change in altitude that is present in the un-smoothed altitude solution.

The altitude solution smoothing function 122C described above has the advantages of providing the smoothed altitude solution 120C while minimizing the phase delay introduced by the filtering. The reducing of the phase delay is enabled by filtering out the high-frequency altitude error resets from the un-smoothed altitude solution 112C without filtering the entire un-smoothed altitude solution 112C. Accordingly, only the abrupt step changes or resets in the Kalman filtered solution are filtered out in the smoothed altitude solution 120C, while there are other dynamics of the altitude of the navigation system that are not delayed or have a phase delay associated with them. Allowing the other dynamic altitude measurements enables the smoothed altitude solution 120C generated by the altitude solution smoothing function 122C to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed altitude solution 120C is used with a vehicle's autopilot system to smooth out the autopilot's response to changes in the navigation solution. Using the smoothed altitude solution 120C enables the autopilot to accurately respond to changes or corrections in the altitude solution data without commanding a vehicle to perform an abrupt maneuver. In exemplary embodiments, the smoothed altitude solution 120C is used to control where a seeker is pointed or help steer a GNSS receiver to track GNSS signals better. In exemplary embodiments, the speed at which the smoothed altitude solution 120C converges to the un-smoothed altitude solution 112C can be adjusted by a user.

Figure 2D:
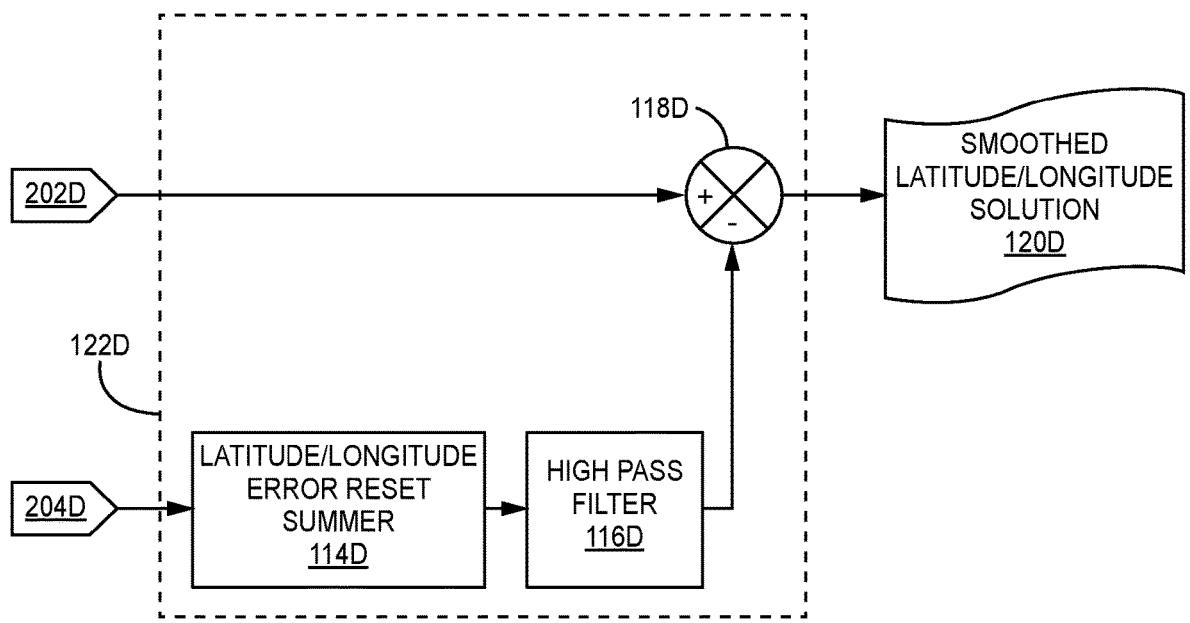

FIG. 2D is a block diagram depicting an exemplary embodiment of a latitude/longitude solution smoothing function 122D focused on generating a smoothed latitude/longitude solution 120D. Latitude/longitude solution smoothing function 122D is configured to receive an un-smoothed latitude/longitude solution as a first input 202D and latitude/longitude error resets as a second input 204D from an associated STDV error threshold monitor 126 and is configured to generate the smoothed latitude/longitude solution 120D. The unsmoothed latitude/longitude solution may be included in the un-smoothed navigation solution 112 described above. Similarly, the latitude/longitude error resets may be included in state variable error resets received from a Kalman filter or another source as described above. Latitude/longitude solution smoothing function 122D includes latitude/longitude error reset summer 114D, high-pass filter 116D, summer 118D, and output of the smoothed latitude/longitude solution 120D. Latitude/longitude error reset summer 114D is configured to receive latitude/longitude error resets from the second input 204D from an associated STDV error threshold monitor 126 and to sum the latitude/longitude error resets into a cumulative sum of latitude/longitude error resets.

In exemplary embodiments, the high-pass filter 116D is configured to receive the cumulative sum of latitude/longitude error resets from the latitude/longitude error reset summer 114D, and high-pass filters the cumulative sum. In exemplary embodiments, the high-pass filter 116D filters out the low frequency data from the cumulative sum of latitude/longitude error resets that is changing slowly (and is not likely to be part of a step change in the un-smoothed latitude/longitude solution 112D), leaving the information that is changing rapidly (that is likely to be a part of one or more step changes to the un-smoothed latitude/longitude solution 112D). In exemplary embodiments, the high-pass filter 116D filters out the more steady-state values of the cumulative sum of latitude/longitude error resets to leave the information changing quickly. In exemplary embodiments, the summer 118D is configured to subtract the high-pass filtered cumulative sum of the latitude/longitude error resets from the un-smoothed latitude/longitude solution received from the first input 202D to generate the smoothed latitude/longitude solution 120D. The previous high-pass filtering of the cumulative sum of the latitude/longitude error resets isolated the effects of the latitude/longitude error resets that should be removed from the smoothed latitude/longitude solution 120D to mitigate the step change in latitude/longitude that is present in the un-smoothed latitude/longitude solution.

The latitude/longitude solution smoothing function 122D described above has the advantages of providing the smoothed latitude/longitude solution 120D while reducing the phase delay introduced by the filtering. The reduction of phase delay is enabled by filtering out the high-frequency latitude/longitude error resets from the un-smoothed latitude/longitude solution 112D without filtering the entire un-smoothed latitude/longitude solution 112D. Accordingly, only the abrupt step changes or resets in the Kalman filtered solution are filtered out in the smoothed latitude/longitude solution 120D, while there are other dynamics of the latitude/longitude of the navigation system that are not delayed or have a phase delay associated with them. The dynamic latitude/longitude measurements enable the smoothed latitude/longitude solution 120D generated by the latitude/longitude solution smoothing function 122D to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed latitude/longitude solution 120D is used with a vehicle's autopilot system to smooth out the autopilot's response to changes in the navigation solution. Using the smoothed latitude/longitude solution 120D enables the autopilot to accurately respond to changes or corrections in the latitude/longitude solution data without commanding a vehicle to perform an abrupt maneuver. In exemplary embodiments, the smoothed latitude/longitude solution 120D is used to control where a seeker is pointed or help steer a GNSS receiver to track GNSS signals better. In exemplary embodiments, the speed at which the smoothed latitude/longitude solution 120D converges to the un-smoothed latitude/longitude solution 112D can be adjusted by a user. While the latitude/longitude solutions are described as being smoothed together, in other embodiments, the latitude and longitude solutions are smoothed separately with separate components.

Figure 2E:
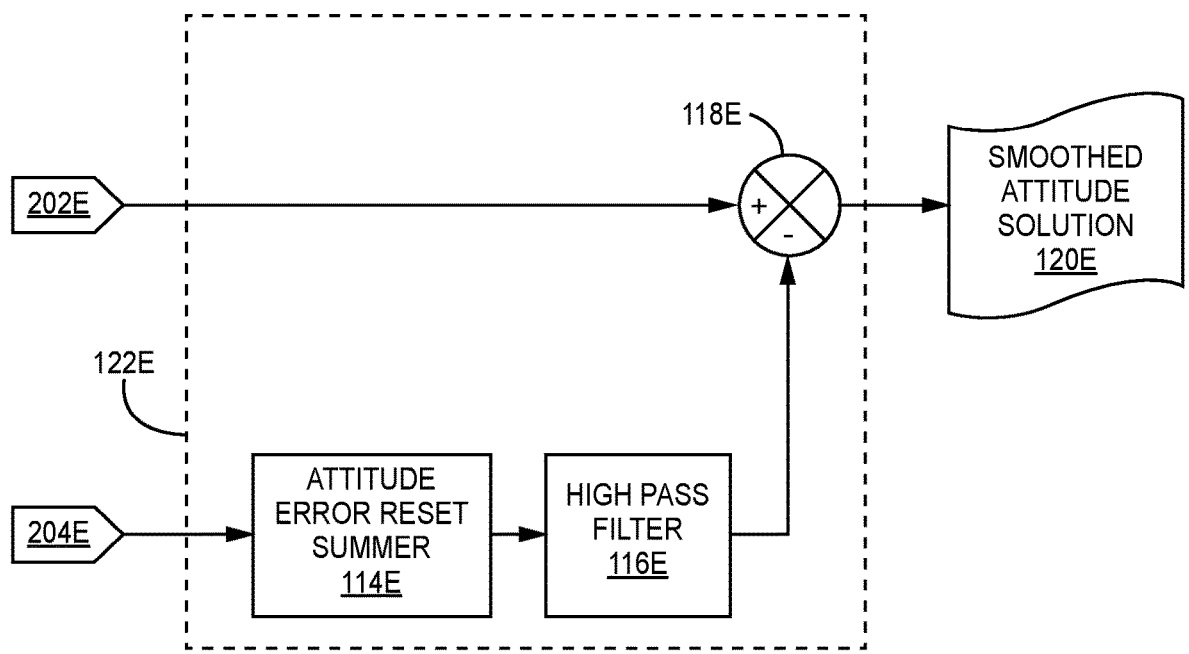

FIG. 2E is a block diagram depicting an exemplary embodiment of an attitude solution smoothing function 122E focused on generating a smoothed attitude solution 120E. Attitude solution smoothing function 122E is configured to receive an un-smoothed attitude solution as a first input 202E and attitude error resets as a second input 204E and is configured to generate the smoothed attitude solution 120E. The unsmoothed attitude solution may be included in the un-smoothed navigation solution 112 described above. Similarly, the attitude error resets may be included in state variable error resets received from a Kalman filter or another source as described above. Attitude solution smoothing function 122E includes attitude error reset summer 114E, high-pass filter 116E, summer 118E, and output of the smoothed attitude solution 120E. Attitude error reset summer 114E is configured to receive attitude error resets from a second input 204E from an associated STDV error threshold monitor 126 and to sum the attitude error resets into a cumulative sum of attitude error resets.

In exemplary embodiments, the high-pass filter 116E is configured to receive the cumulative sum of attitude error resets from the attitude error reset summer 114E and high-pass filters the cumulative sum. In exemplary embodiments, the high-pass filter 116E filters out the low frequency data from the cumulative sum of attitude error resets that is changing slowly (and is not likely to be part of a step change in the un-smoothed attitude solution 112E), leaving the information that is changing rapidly (that is likely to be a part of one or more step changes to the un-smoothed attitude solution 112E). In exemplary embodiments, the summer 118E is configured to subtract the high-pass filtered cumulative sum of the attitude error resets from the un-smoothed attitude solution received from first input 202E to generate the smoothed attitude solution 120E. The previous high-pass filtering of the cumulative sum of the attitude error resets isolated the effects of the attitude error resets that should be removed from the smoothed attitude solution 120E to mitigate the step change in attitude that is present in the un-smoothed attitude solution.

The attitude solution smoothing function 122E described above has the advantages of providing the smoothed attitude solution 120E while reducing the phase delay introduced by the filtering. The reduction of the phase delay is enabled by filtering out the high-frequency attitude error resets from the un-smoothed attitude solution 112E without filtering the entire un-smoothed attitude solution 112E. Accordingly, only the abrupt step changes or resets in the Kalman filtered solution are filtered out in the smoothed attitude solution 120E, while there are other dynamics of the attitude of the navigation system that will not be delayed or have a phase delay associated with them. The dynamic attitude measurements enable the smoothed attitude solution 120E generated by the attitude solution smoothing function 122E to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed attitude solution 120E is used with a vehicle's autopilot system to smooth out the autopilot's response to changes in the navigation solution. Using the smoothed navigation solution 120 enables the autopilot to accurately respond to changes or corrections in the attitude solution data without commanding a vehicle to perform an abrupt maneuver. In exemplary embodiments, the smoothed attitude solution 120E is used to control where a seeker is pointed or to help steer a GNSS receiver to better track GNSS signals. In exemplary embodiments, the speed at which the smoothed attitude solution 120E converges to the un-smoothed attitude solution 112E can be adjusted by a user.

FIGS. 3A-3E are block diagrams depicting exemplary embodiments for producing accuracy estimations. In particular, each of FIGS. 3A-3E illustrates a different embodiment of a function 336A-336E for producing accuracy estimates.

Figure 3A:
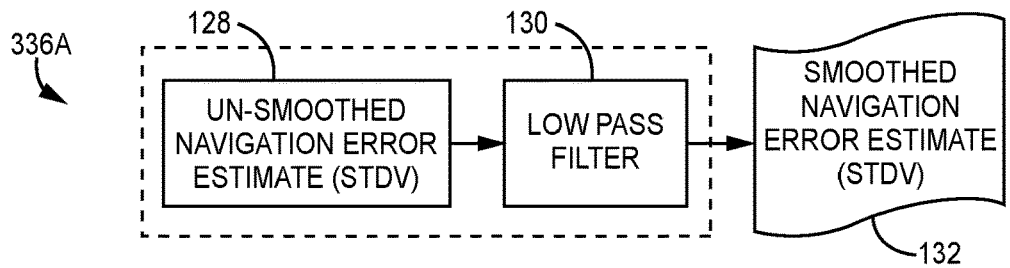
FIGS. 3A-3E are block diagrams depicting exemplary embodiments of a function for calculating the accuracy of the state variables according to an aspect of the present disclosure.

FIG. 3A illustrates an embodiment of a function 336A for producing a smoothed state variable error estimate. The function 336A produces a smoothed STDV navigation error estimate 132. As described above, the smoothed STDV navigation error estimate 132 estimates the accuracy for a particular state variable. The function 336A may calculate the smoothed STDV navigation error estimate 132 using various methods. For example, function 336A may calculate an un-smoothed navigation error estimate 128 as a standard deviation for the state variable. After calculating the un-smoothed navigation error estimate 128, the function 336A may include a low pass filter 130. The low-pass filter 130 may filter out high-frequency state variable STDV error estimates 128. As described above, the un-smoothed navigation error estimate 128 may also be adjusted to a scheduled gain approach that reflects whether a navigation system 100 is receiving GNSS signals or receiving GNSS signals in a degraded accuracy state relative to the intended state for the smoothed filter. In some embodiments, the function 336A may use a combination of the low pass filtering and the scheduled gain approach.

Figure 3B:
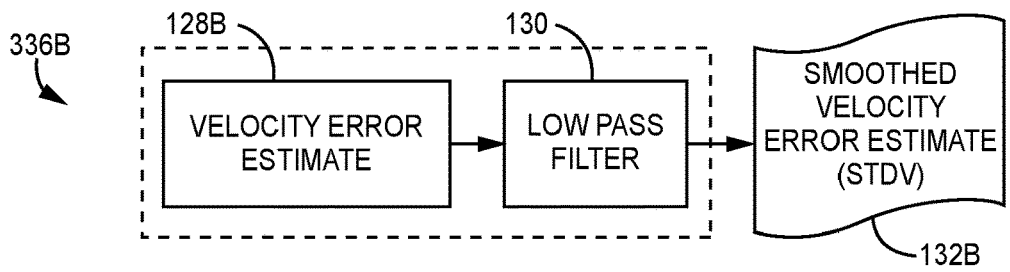

FIG. 3B illustrates an embodiment of a function 336B for producing a smoothed velocity error estimate. The function 336B produces a smoothed velocity error estimate 132B. As described above, the smoothed velocity error estimate 132B estimates the accuracy for the velocity of a moving object. The function 336B may calculate the smoothed velocity error estimate 132B using various methods. For example, may calculate a velocity error estimate 128B as a standard deviation for velocity. After calculating the velocity error estimate 128B, the function 336B may include a low pass filter 130. The low-pass filter 130 may filter out high-frequency velocity error estimates 128B. The low-pass filter 130 may be designed to be a −3 db frequency and be nominally related to the frequency of the high-pass filter 116. The velocity error estimate 128 may also be adjusted to a scheduled gain approach that reflects whether the navigation system 100 is receiving GNSS signals or receiving GNSS signals in a degraded accuracy state relative to the intended state for the smoothed filter. In some embodiments, the function 336B may use a combination of the low pass filtering and the scheduled gain approach.

Figure 3C:
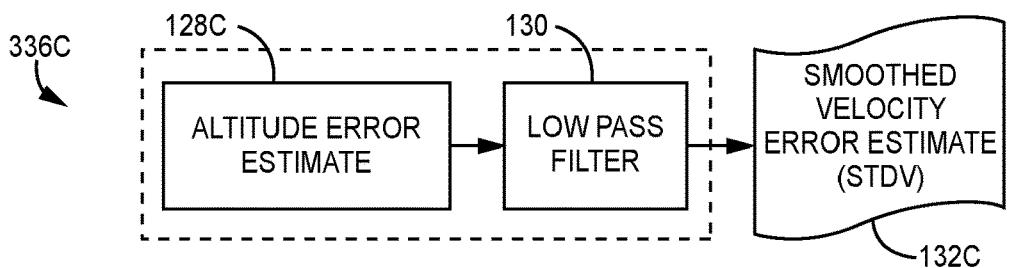

FIG. 3C illustrates an embodiment of a function 336C for producing a smoothed altitude error estimate. The function 336C produces a smoothed altitude error estimate 132C. As described above, the smoothed altitude error estimate 132C estimates the accuracy for the altitude of a moving object. The function 336C may calculate the smoothed altitude error estimate 132C using various methods. For example, may calculate an altitude error estimate 128C as a standard deviation for altitude. After calculating the altitude error estimate 128C, the function 336C may include a low pass filter 130. The low-pass filter 130 may filter out high-frequency altitude error estimates 128C. The low-pass filter 130 may be designed to be a −3 db frequency and be nominally related to the frequency of the high-pass filter 116. The altitude error estimate 128 may also be adjusted to a scheduled gain approach that reflects whether the navigation system 100 is receiving GNSS signals or receiving GNSS signals in a degraded accuracy state relative to the intended state for the smoothed filter. In some embodiments, the function 336C may use a combination of the low pass filtering and the scheduled gain approach.

Figure 3D:
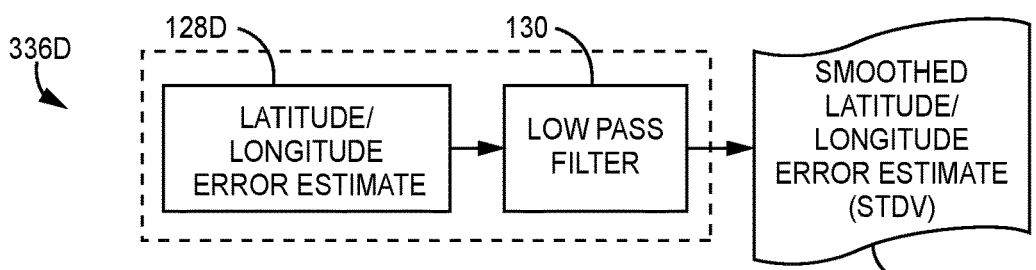

FIG. 3D illustrates an embodiment of a function 336D for producing a smoothed latitude/longitude error estimate. The function 336D produces a smoothed latitude/longitude error estimate 132D. As described above, the smoothed latitude/longitude error estimate 132D estimates the accuracy for the latitude/longitude of a moving object. The function 336D may calculate the smoothed latitude/longitude error estimate 132D using various methods. For example, may calculate a latitude/longitude error estimate 128D as a standard deviation for latitude/longitude. After calculating the latitude/longitude error estimate 128D, the function 336D may include a low pass filter 130. The low-pass filter 130 may filter out high-frequency latitude/longitude error estimates 128D. The low-pass filter 130 may be designed to be a −3 db frequency and be nominally related to the frequency of the high-pass filter 116. The latitude/longitude error estimate 128 may also be adjusted to a scheduled gain approach that reflects whether the navigation system 100 is receiving GNSS signals or receiving GNSS signals in a degraded accuracy state relative to the intended state for the smoothed filter. In some embodiments, the function 336D may use a combination of the low pass filtering and the scheduled gain approach.

Figure 3E:
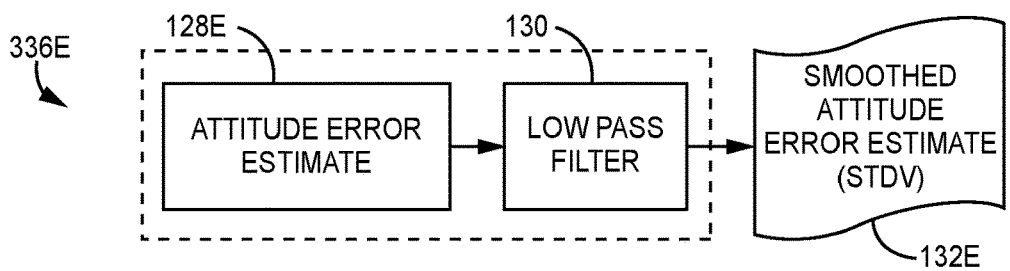

FIG. 3E illustrates an embodiment of a function 336E for producing a smoothed attitude error estimate. The function 336E produces a smoothed attitude error estimate 132E. As described above, the smoothed attitude error estimate 132E estimates the accuracy for the attitude of a moving object. The function 336E may calculate the smoothed attitude error estimate 132E using various methods. For example, may calculate an attitude error estimate 128E as a standard deviation for attitude. After calculating the attitude error estimate 128E, the function 336E may include a low pass filter 130. The low-pass filter 130 may filter out high-frequency attitude error estimates 128E. The low-pass filter 130 may be designed to be a −3 db frequency and be nominally related to the frequency of the high-pass filter 116. The attitude error estimate 128 may also be adjusted to a scheduled gain approach that reflects whether the navigation system 100 is receiving GNSS signals or receiving GNSS signals in a degraded accuracy state relative to the intended state for the smoothed filter. In some embodiments, the function 336E may use a combination of the low pass filtering and the scheduled gain approach.

Figure 4A:
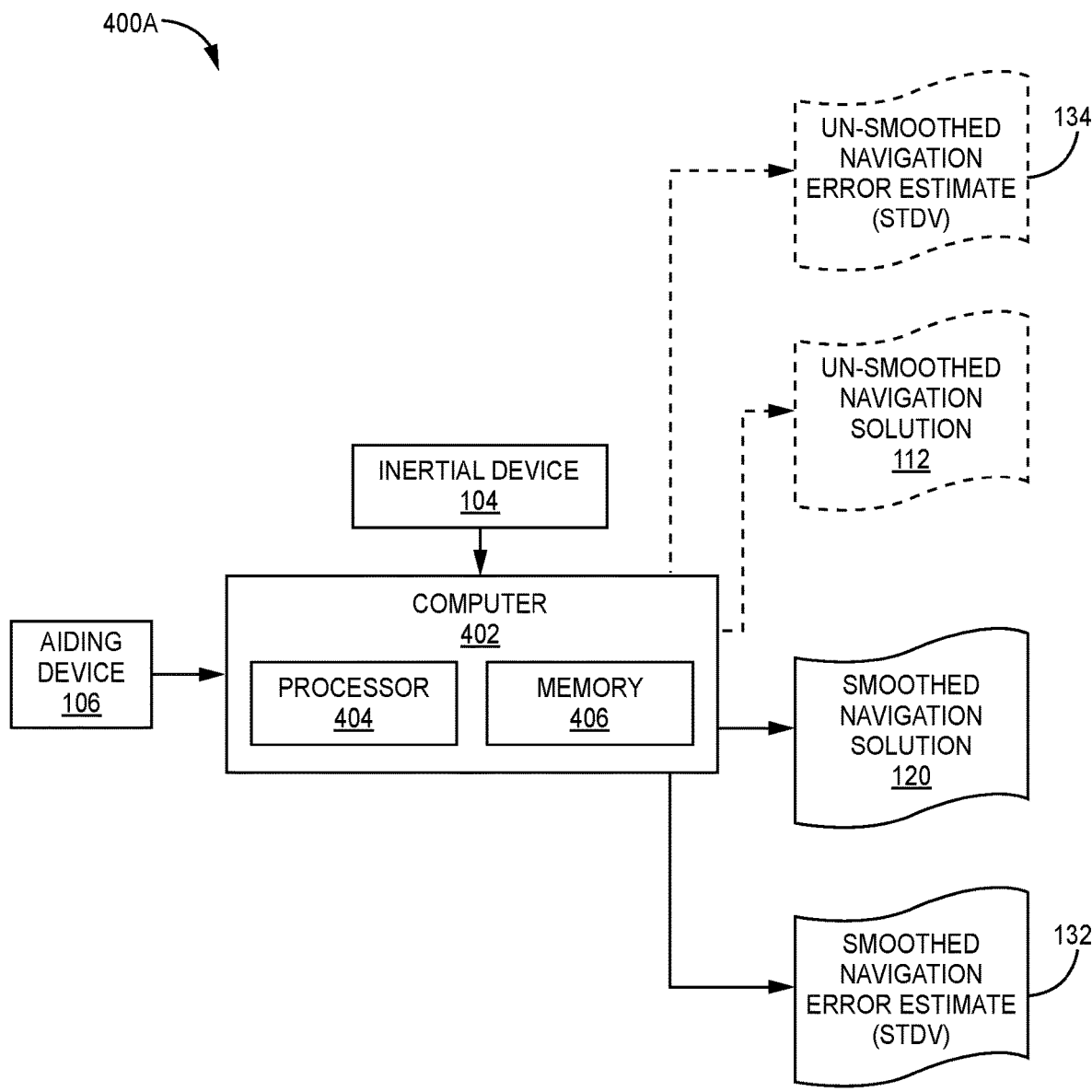
FIGS. 4A-4C are block diagrams depicting additional exemplary embodiments of navigation systems according to an aspect of the present disclosure.
Figure 4B:
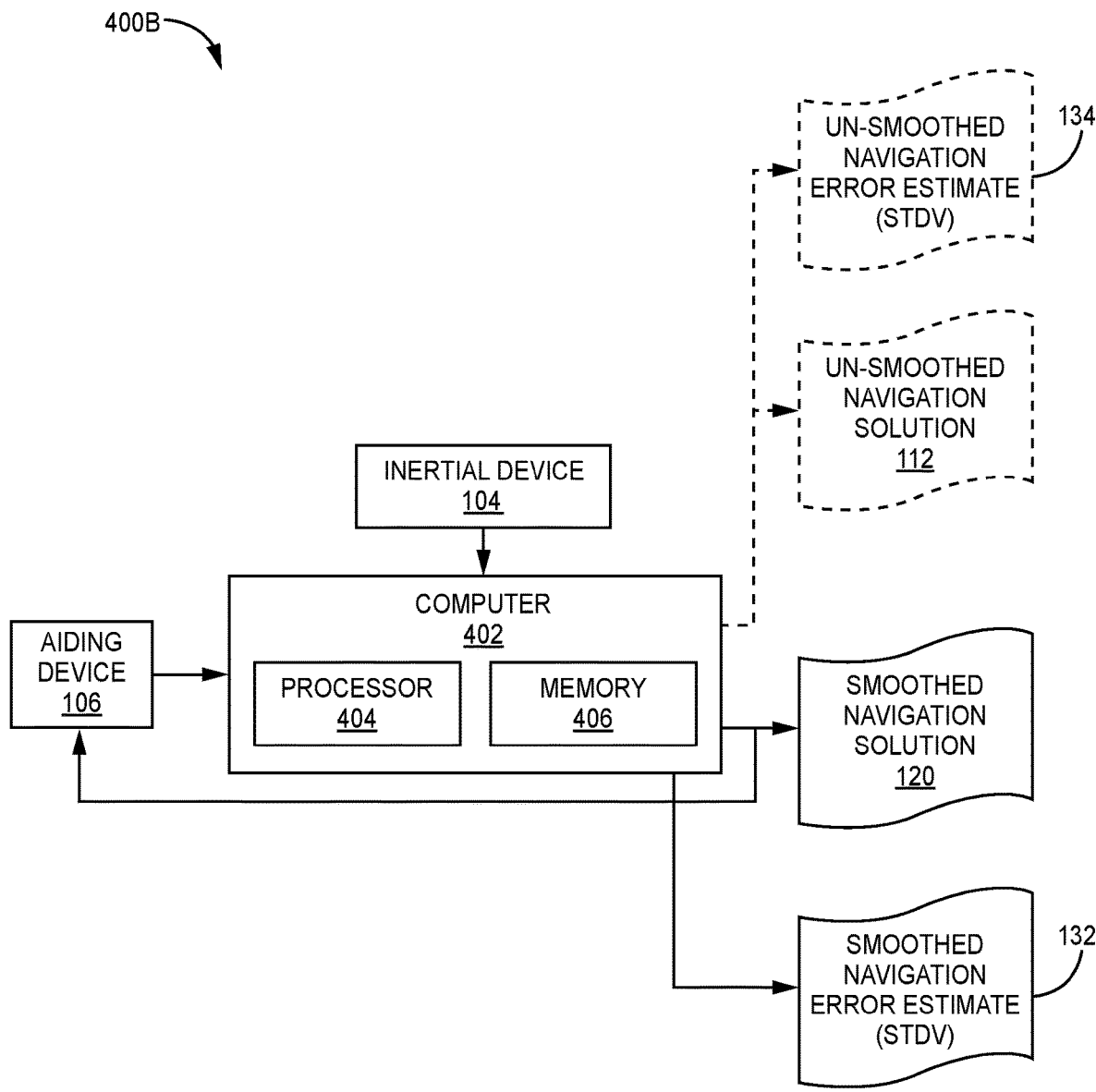
Figure 4C:
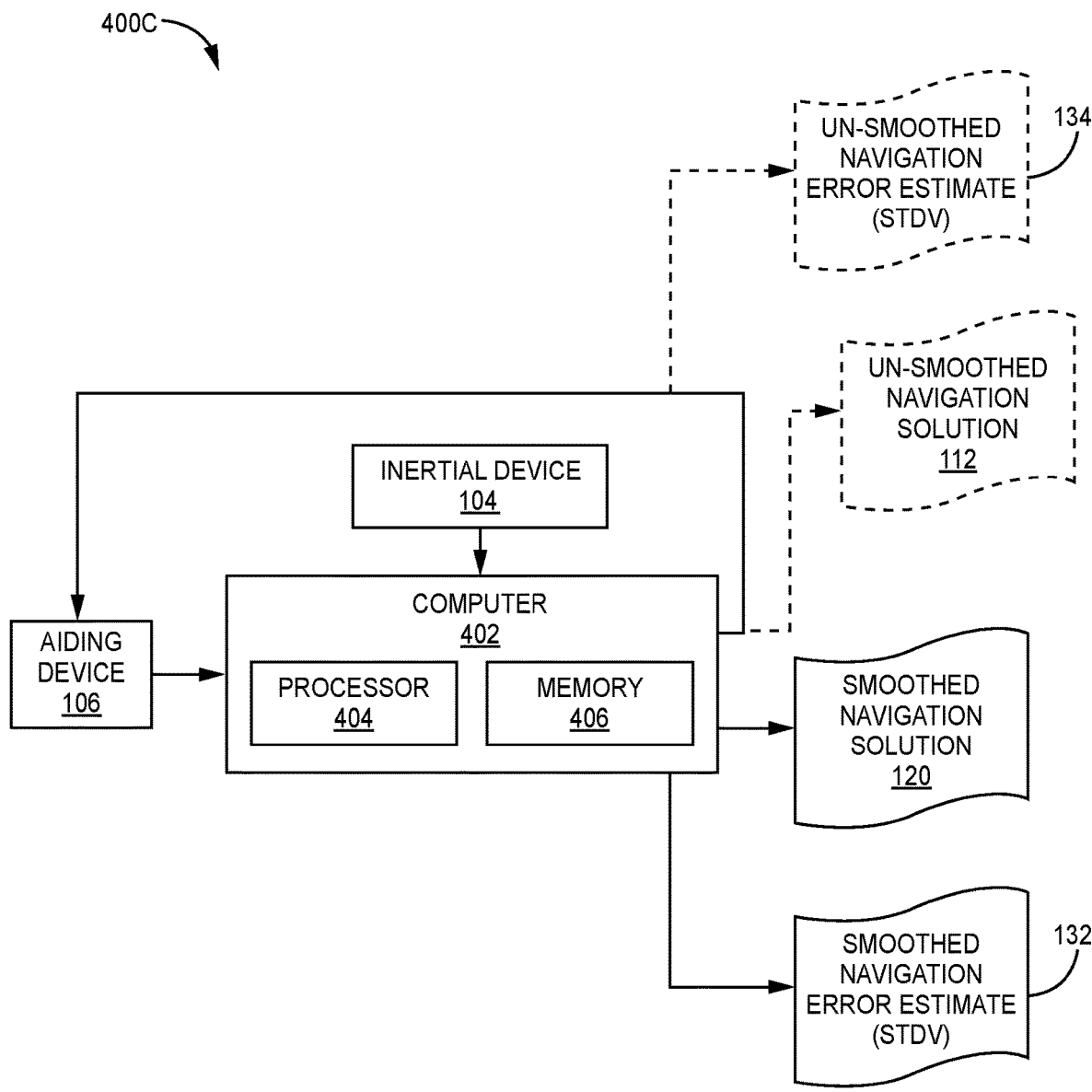

FIGS. 4A-4C are block diagrams depicting exemplary embodiments of navigation systems 400. While any of navigation systems 400 may be implemented on aircraft (including jets, planes, helicopters, blimps, and balloons), they can also be implemented onboard other vehicles, such as space vehicles, sea vessels (including ships and submersibles), and ground vehicles; missiles, rockets, and other ballistics and projectiles; integrated into systems worn by individuals on the ground, in structures or caverns, in air, on or in water, or in space; integrated into buildings, other structures, or caverns; or integrated in other ways and for other uses. Each of FIGS. 4A-4C illustrates a different embodiment of navigation system 400, labeled 400A-400C, respectively.

FIG. 4A is a block diagram depicting an exemplary embodiment of a navigation system 400A. Navigation system 400A includes a computer 402, the inertial device 104, the aiding device 106, the optional output of an un-smoothed navigation solution 112, the output of a smoothed navigation solution 120, the output of a smoothed navigation error estimate (STDV) 132, and the output of an un-smoothed STDV navigation error estimate 134. The computer 402 includes a processor 404 (either a singular processor or multiple processors) and memory 406 and is configured to implement the functionality of the navigation solution smoothing function 122 and the navigation solution generation function 124 of navigation system 100A shown in FIG. 1A and described above. Also, the processor 404 is configured to implement the functionality of the state variable error estimate functions 336A-336E in FIGS. 3A-3E and error threshold monitoring described above in connection with FIG. 1A. Additionally, the processor 404 may perform various computational tasks that determine the accuracy of a smoothed navigation solution using filtered resets.

In exemplary embodiments, the aiding device 106 is configured to receive signals regarding the position of the system and is configured to generate aiding device measurement data pertaining to the navigation system 400A. In exemplary embodiments, the aiding device 106 includes one or more of a global navigation satellite system (GNSS) receiver, a magnetometer, a pressure sensor, a master inertial navigation system, a Doppler radar receiver, LOng RAnge Navigation (LORAN) based positioning receiver, and the like. The aiding device 106 is configured to supply the aiding device measurement data to the computer 402. Similarly, the inertial device 104 is configured to detect the motion of the navigation system 400A and to generate inertial data regarding the motion of the navigation system 400A. In exemplary embodiments, the inertial device 104 includes any combination of gyroscopes and accelerometers to detect linear or rotational motion.

To implement the navigation solution generation function 124, the computer 402 is configured to receive the aiding device measurement data from the aiding device 106 and the inertial data from the inertial device 104. The processor 404 on the computer 402 is configured to subtract a previous un-smoothed navigation solution 112 from the aiding device measurement data to determine error measurements between the aiding device measurement data supplied by the aiding device 106 and the previously calculated un-smoothed navigation solution 112. The processor 404 is further configured to generate state variable error resets based on the error measurements between the aiding device measurement data supplied by the aiding device 106 and the previously calculated un-smoothed navigation solution 112. In exemplary embodiments, the state variable error resets include at least one of a velocity error reset, an altitude error reset, a latitude and longitude error reset, and an attitude error reset. The processor 404 is further configured to calculate the un-smoothed navigation solution 112 based on the inertial data received from the inertial device 104 and the generated state variable error resets, the un-smoothed navigation solution inclusive of the navigation state error resets.

To implement the navigation solution smoothing function 122, the processor 404 is configured to sum the generated state variable error resets from the STDV error threshold monitor 126 into a cumulative sum of the state variable error resets. In exemplary embodiments, the state variable resets include at least one of a velocity error reset, an altitude error reset, a latitude and longitude error reset, and an attitude error reset. In exemplary embodiments, the different types of state variable error resets are summed independently of each other to create various cumulative sums of state variable error resets. In exemplary embodiments, the different types of state variable error resets are summed simultaneously. In exemplary embodiments, the processor 404 is configured to generate at least one of a cumulative sum of velocity error resets, a cumulative sum of altitude error resets, a cumulative sum of latitude and longitude error resets, and a cumulative sum of attitude error resets.

To further implement the navigation solution smoothing function 122, the processor 404 is further configured to high-pass filter the cumulative sum of state variable error resets or the cumulative sum of velocity error resets, the cumulative sum of altitude error resets, the cumulative sum of latitude and longitude error resets, and the cumulative sum of attitude error resets. In exemplary embodiments, high-pass filtering filters out the low frequency data that is changing slowly (and is not likely to be part of a step change in the un-smoothed navigation solution 112), leaving the information that is changing rapidly (that is likely to be a part of one or more step changes to the un-smoothed navigation solution 112). Thus, high-pass filtering allows the state variable error resets that are changing fairly rapidly to pass through and filters out the state variable error resets that are not changing rapidly. In exemplary embodiments, high-pass filtering includes various sub-filtering of individual types of cumulative state variable error resets, including the cumulative sum of velocity error resets, the cumulative sum of altitude error resets, the cumulative sum of latitude and longitude error resets, and the cumulative sum of attitude error resets.

To further implement the navigation solution smoothing function 122, the processor 404 is further configured to subtract the high-pass filtered cumulative sum of the variable error resets from the un-smoothed navigation solution 112 to generate the smoothed navigation solution 120. In exemplary embodiments, the processor 404 is configured to subtract the different components of the variable error resets from the corresponding components of the un-smoothed navigation solution 112 to generate various components of the smoothed navigation solution 120, including subtracting at least one of the cumulative sum of velocity error resets from the velocity component of the un-smoothed navigation solution 112 to generate the velocity component of the smoothed navigation solution 120, the cumulative sum of altitude error resets from the altitude component of the un-smoothed navigation solution 112 to generate the altitude component of the smoothed navigation solution 120, the cumulative sum of latitude and longitude error resets from the latitude and longitude component of the un-smoothed navigation solution 112 to generate the latitude and longitude component of the smoothed navigation solution 120, and the cumulative sum of attitude error resets from the attitude component of the un-smoothed navigation solution 112 to generate the velocity component of the smoothed navigation solution 120.

Un-smoothed navigation solution 112 and smoothed navigation solution 120 generated by the navigation system 400A may include any type of navigation solution, including a velocity solution, an altitude solution, a latitude and longitude solution, and an attitude solution and any combinations or derivatives thereof. In exemplary embodiments, the un-smoothed navigation solution 112 and the smoothed navigation solution 120 include a single type of navigation solution. In other exemplary embodiments, the un-smoothed navigation solution 112 and the smoothed navigation solution 120 include a plurality of types of navigation solutions.

The navigation system 400A described above has the advantages of providing the smoothed navigation solution 120 while reducing the phase delay introduced by the filtering. The reduction in phase delay is enabled by filtering out the high-frequency state variable error resets from the un-smoothed navigation solution 112 without filtering the entire un-smoothed navigation solution 112. Accordingly, only the abrupt step changes or resets in the Kalman filtered solution are filtered out in the smoothed navigation solution 120, while there are other dynamics of the movement of the navigation system 100A that are not delayed or have a phase delay associated with them. The dynamic measurements enable the smoothed navigation solution 120 generated by the navigation system 400A to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed navigation solution 120 is used with a vehicle's autopilot system to smooth out the autopilot's response to changes in the navigation solution. Using the smoothed navigation solution 120 enables the autopilot to accurately respond to changes or corrections in the navigation solution data without commanding a vehicle to perform an abrupt maneuver. In exemplary embodiments, the smoothed navigation solution 120 is used to control where a seeker is pointed or help steer a GNSS receiver to track GNSS signals better. In exemplary embodiments, the speed at which the smoothed navigation solution 120 converges to the un-smoothed navigation solution can be adjusted by a user.

To further implement the state variable error estimate functions 336A-336E, the processor 404 produces a smoothed STDV navigation error estimate 132. As described above, the smoothed STDV navigation error estimate 132 estimates the accuracy for a particular state variable. The processor 404 may calculate the smoothed STDV navigation error estimate 132 using various methods. For example, the processor 404 may calculate an un-smoothed navigation error estimate 128 as a standard deviation for the state variable. After calculating the un-smoothed navigation error estimate 128, the processor 404 may include a low pass filter 130. The low-pass filter 130 may filter out high-frequency state variable STDV error estimates 128. As described above, the un-smoothed navigation error estimate 128 may also be adjusted to a scheduled gain approach that reflects whether a navigation system 100 is receiving GNSS signals or receiving GNSS signals in a degraded accuracy state relative to the intended state for the smoothed filter. In some embodiments, the processor 404 may use a combination of the low pass filtering and the scheduled gain approach.

Additionally, the processor 404 may further implement the error threshold monitoring associated with the STDV error threshold monitor 126. In particular, the processor 404 performs a smoothed filter reset logic that determines if an associated state variable has exceeded an accuracy threshold. For example, if the accuracy of a state variable exceeds a threshold value, the STDV error threshold monitor 126 may provide a smoothed filter reset to the state variable error reset summer 114. The state variable error reset summer 114 sums the received resets as described above. Additionally, the STDV error threshold monitor 126 performs a second reset logic that determines whether the Kalman filter 108 (or other applied navigation filter) is likely in an invalid operating state and should receive an un-smoothed navigation solution filter reset. For example, an outage from GNSS signals may be substantially extended such that the Kalman filter 108 is likely not in a valid operating state. When the Kalman filter 108 receives an un-smoothed navigation solution filter reset, the Kalman filter 108 may re-initialize operation upon the reception of GNSS signals. The processor 404 determines when to apply either the smoothed filter reset or the second reset based on the non-smoothed navigation solution 112 and the smoothed navigation error estimate 132 as compared against the thresholds.

FIG. 4B is a block diagram depicting an exemplary embodiment of a navigation system 400B. The navigation system 400B includes a computer 402, the inertial device 104, the aiding device 106, the optional output of the un-smoothed navigation solution 112, the output of the smoothed navigation solution 120, the output of a smoothed navigation error estimate (STDV) 132, and the output of an un-smoothed STDV navigation error estimate 134. The computer 402 includes a processor 404 and a memory 406 that are configured to implement the functionality of the navigation solution smoothing function 122 and the navigation solution generation function 124 of the navigation system 100B shown in FIG. 1B and described above. Also, the processor 404 is configured to implement the functionality of the state variable error estimate functions 336A-336E in FIGS. 3A-3E and error threshold monitoring described above in connection with FIG. 1A. The navigation system 400B includes similar components to navigation system 400A and operates according to similar principles and methods as navigation system 400A described above. The difference between navigation system 400B and navigation system 400A is that navigation system 400B includes feedback of the smoothed navigation solution 120 to the aiding device 106.

In exemplary embodiments, the aiding device 106 is configured to receive the smoothed navigation solution 120 and to use the smoothed navigation solution 120 to aid in generating aiding device measurement data based on the position of the system. In exemplary embodiments, the use of the smoothed navigation solution 120 by the aiding device 106 reduces the chance that the aiding device 106 loses lock within its loops based on a step change that may be present in the un-smoothed navigation solution 112.

FIG. 4C is a block diagram depicting an exemplary embodiment of a navigation system 400C. Navigation system 400C includes a computer 402, the inertial device 104, the aiding device 106, the optional output of the un-smoothed navigation solution 112, the output of the smoothed navigation solution 120, and the output of a smoothed navigation error estimate (STDV) 132, and the output of an un-smoothed STDV navigation error estimate 134. The computer 402 includes the processor 404 and the memory 406 that are configured to implement the functionality of the navigation solution smoothing function 122 and the navigation solution generation function 124 of navigation system 100C shown in FIG. 1C and described above. Also, the processor 404 is configured to implement the functionality of the state variable error estimate functions 336A-336E in FIGS. 3A-3E and error threshold monitoring described above in connection with FIG. 1A. Navigation system 400C includes similar components to navigation system 400A and operates according to similar principles and methods as navigation system 400A described above. The difference between navigation system 400C and navigation system 400A is that navigation system 400C includes feedback of the un-smoothed navigation solution 112 to the aiding device 106.

In exemplary embodiments, the aiding device 106 is configured to receive the un-smoothed navigation solution 112 and to use the un-smoothed navigation solution 112 to aid in generating aiding device measurement data based on the position, velocity, or orientation of the system. In exemplary embodiments, using the un-smoothed navigation solution 112 instead of the smoothed navigation solution 120 by the aiding device 106 will not as effectively reduce the chance that the aiding device 106 loses lock within its loops based on a step change present in the un-smoothed navigation solution 112.

Figure 5:
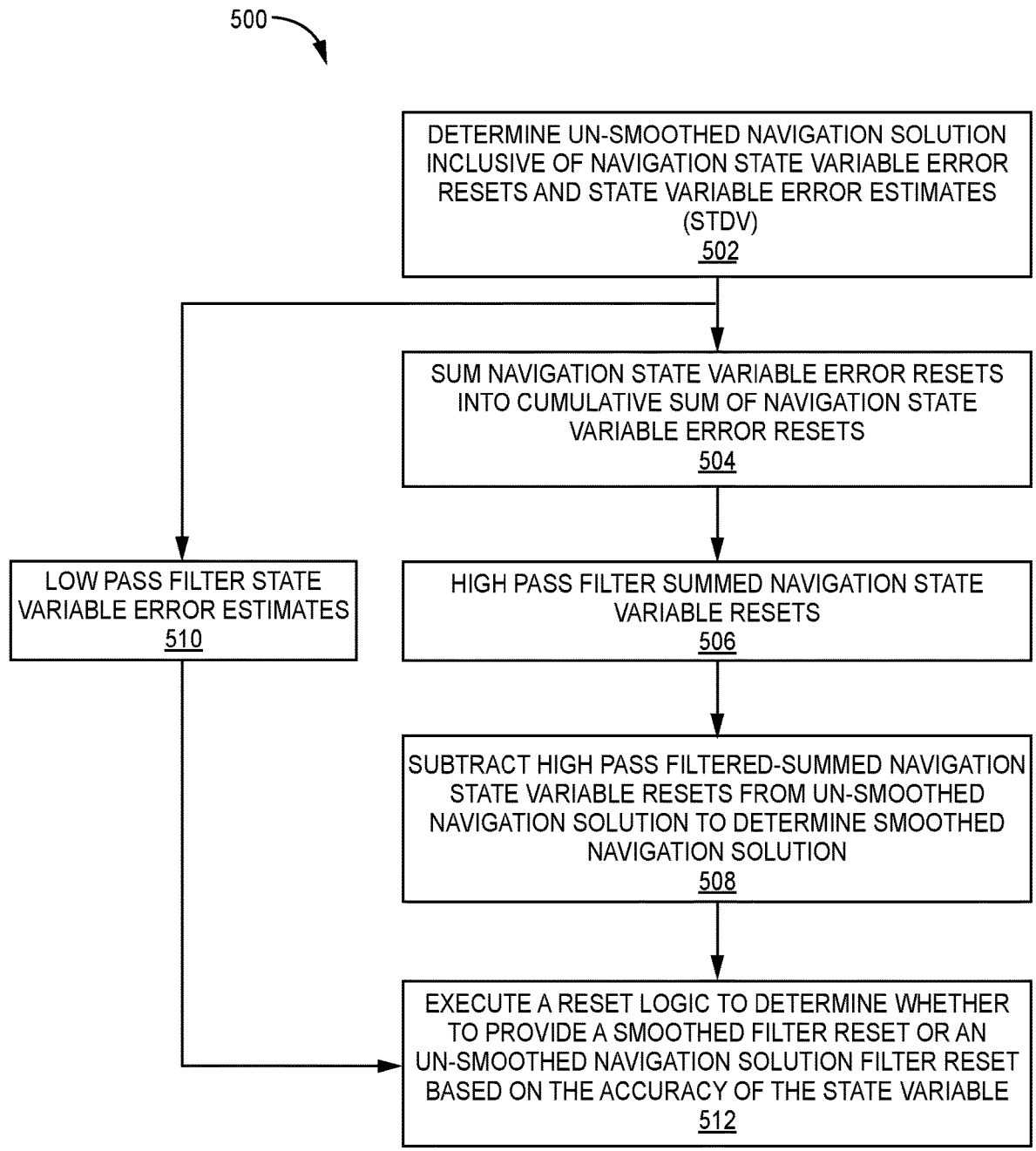
FIG. 5 is a flow diagram depicting an exemplary embodiment of a method according to an aspect of the present disclosure.

FIG. 5 is a flow diagram depicting an exemplary method 500. Exemplary method 500 begins at block 502 with determining an un-smoothed navigation solution inclusive of navigation state variable error resets and state variable error estimates (STDV). In exemplary embodiments, determining the un-smoothed navigation solution inclusive of navigation state error resets and state variable error estimates is based on aiding device measurement data provided by an aiding device and inertial data provided by an inertial device. In exemplary embodiments, determining the un-smoothed navigation solution includes subtracting a previously calculated un-smoothed navigation solution from the aiding device measurement data to determine error measurements between the aiding device measurement data and the previously calculated un-smoothed navigation solution; generating state variable error resets based on the error measurements between the aiding device measurement data and the previously calculated navigation solution; and generating the un-smoothed navigation solution inclusive of navigation state variable error resets based on the inertial data and the aiding device measurement data by calculating the un-smoothed navigation solution based on the inertial data and the state variable error resets. Additionally, the navigation solution may be calculated based on the error estimates for the different state variables in the navigation solution. In exemplary embodiments, the un-smoothed navigation solution includes at least one of a velocity solution, an altitude solution, a latitude solution, a longitude solution, and an attitude solution.

Exemplary method 500 proceeds to block 504 with summing navigation state variable error resets into a cumulative sum of the navigation state variable error resets. In exemplary embodiments, the navigation state variable error resets include at least one of a velocity error reset, an altitude error reset, a latitude and longitude error reset, and an attitude error reset. In exemplary embodiments, summing navigation state variable error resets into a cumulative sum of the state variable error resets includes summing at least one of the velocity error resets, the altitude error resets, the latitude and longitude error resets, and the attitude error resets.

Exemplary method 500 proceeds to block 506 with high-pass filtering the cumulative sum of the state variable error resets. In exemplary embodiments, high-pass filtering the cumulative sum of the state variable error resets includes high-pass filtering at least one of a cumulative sum of velocity error resets, a cumulative sum of altitude error resets, a cumulative sum of latitude and longitude error resets, and a cumulative sum of attitude error resets. In exemplary embodiments, high-pass filtering filters out the low frequency data that is changing slowly (and is not likely to be part of a step change in the un-smoothed navigation solution), leaving the information that is changing rapidly (that is likely to be a part of one or more step changes to the un-smoothed navigation solution). Thus, high-pass filtering allows the state variable error resets that are changing rapidly to pass through and filters out the state variable error resets that are not changing rapidly. In exemplary embodiments, high-pass filtering includes various sub-filtering of individual types of cumulative state variable error resets, including the cumulative sum of velocity error resets, the cumulative sum of altitude error resets, the cumulative sum of latitude and longitude error resets, and the cumulative sum of attitude error resets.

Exemplary method 500 proceeds to block 508 by subtracting the high-pass filtered cumulative sum of the state variable error resets from the un-smoothed navigation solution to generate a smoothed navigation solution. The previous high-pass filtering of the cumulative sum of the state variable error resets isolated the effects of the error resets that should be removed from the un-smoothed navigation solution to mitigate the step change that is present in the un-smoothed navigation solution. Thus, the smoothed navigation solution may not include the fast-changing data caused by the resets that are present in the un-smoothed navigation solution and will not have large step changes. Still, even with filtering these resets, the smoothed navigation solution (that responds more gradually to the state variable error resets) will eventually converge with the un-filtered navigation solution (that responds more quickly to the state variable error resets).

In exemplary embodiments, the smoothed navigation solution includes at least one of a velocity solution, an altitude solution, a latitude solution, a longitude solution, and an attitude solution. In exemplary embodiments, subtracting at block 508 includes subtracting the different components of variable error resets from the corresponding components of the un-smoothed navigation solution. Subtracting the different components may include subtracting at least one of the cumulative sum of velocity error resets from the velocity component of the un-smoothed navigation solution to generate the velocity component of the smoothed navigation solution, the cumulative sum of altitude error resets from the altitude component of the un-smoothed navigation solution to generate the altitude component of the smoothed navigation solution, the cumulative sum of latitude and longitude error resets from the latitude and longitude component of the un-smoothed navigation solution to generate the latitude and longitude component of the smoothed navigation solution, and the cumulative sum of attitude error resets from the attitude component of the un-smoothed navigation solution to generate the velocity component of the smoothed navigation solution.

Exemplary method 500 proceeds to block 510 by low pass filtering the state variable error estimates include in the un-smoothed navigation solution. For example, the standard deviations for the different state variables may be passed through a low pass filter to filter out high-frequency estimates of the accuracy for the state variables. Alternatively, the standard deviations may be adjusted according to a scheduled gain approach that reflects whether a system is receiving GNSS signals or receiving GNSS signals having a degraded accuracy.

Exemplary method 500 proceeds to block 512 by executing a reset logic to determine whether to provide a smoothed filter reset or an un-smoothed navigation solution filter reset based on the accuracy of the state variable. The reset logic may include comparing the estimated accuracy against an accuracy threshold. If the estimated accuracy exceeds the accuracy threshold, the reset logic may cause a smoothed filter reset to be provided to the state variable error reset summer. Additionally, the reset logic may determine whether a navigation filter is in an invalid operating state. When the navigation filter is in an invalid operating state, the reset logic may provide an un-smoothed navigation solution filter reset to the navigation filter. For example, an outage from GNSS signals may be substantially extended such that the navigation filter is likely not in a valid operating state. When the navigation filter receives an un-smoothed navigation solution filter reset, the navigation filter may re-initialize operation upon the reception of GNSS signals. The reset logic may additionally determine whether to provide the smoothed filter reset or the un-smoothed navigation solution filter reset based on a comparison of the non-smoothed navigation solution in addition to the estimated accuracy against the accuracy thresholds.

Method 500 has the advantage of providing the smoothed navigation solution while reducing the phase delay introduced by the filtering. The reduction in phase delay is enabled by filtering out the high-frequency state variable error resets from the un-smoothed navigation solution without filtering the entire un-smoothed navigation solution. Accordingly, only the abrupt step changes or resets in the Kalman filtered solution are filtered out in the smoothed navigation solution, while there are other dynamics of the movement of the navigation system that are not delayed or have a phase delay associated with them. The dynamic measurements enable the smoothed navigation solution generated by method 500 to eventually converge with the un-smoothed navigation solution, just less abruptly.

In exemplary embodiments, the smoothed navigation solution generated by method 500 is provided to a user to smooth out the step changes that would otherwise be present in the un-smoothed navigation solution. In exemplary embodiments, the smoothed navigation solution is used with a vehicle's autopilot system to smooth out the autopilot's response to changes in the navigation solution. Using the smoothed navigation solution enables the autopilot to accurately respond to changes or corrections in the navigation solution data without commanding a vehicle to perform an abrupt maneuver. In exemplary embodiments, the smoothed navigation solution is used to control where a seeker is pointed or help steer a GNSS receiver to track GNSS signals better. In exemplary embodiments, the speed at which the smoothed navigation converges to the un-smoothed navigation solution can be adjusted by a user.

In exemplary embodiments including the aiding device, method 500 further includes receiving the smoothed navigation solution at the aiding device; and generating the aiding device measurement data based on signals regarding the position, the velocity, or the orientation of the system and the smoothed navigation solution received at the aiding device. In exemplary embodiments including the aiding device, method 500 further includes receiving the un-smoothed navigation solution at the aiding device; and generating the aiding device measurement data based on signals regarding the position, the velocity, or the orientation of the system and the un-smoothed navigation solution received at the aiding device. In exemplary embodiments including the aiding device, the aiding device 106 includes at least one of a global navigation satellite system (GNSS) receiver, a magnetometer, a pressure sensor, a master inertial navigation system, a Doppler radar receiver, LOng RAnge Navigation (LORAN) based positioning receiver, and the like.

Figure 6:
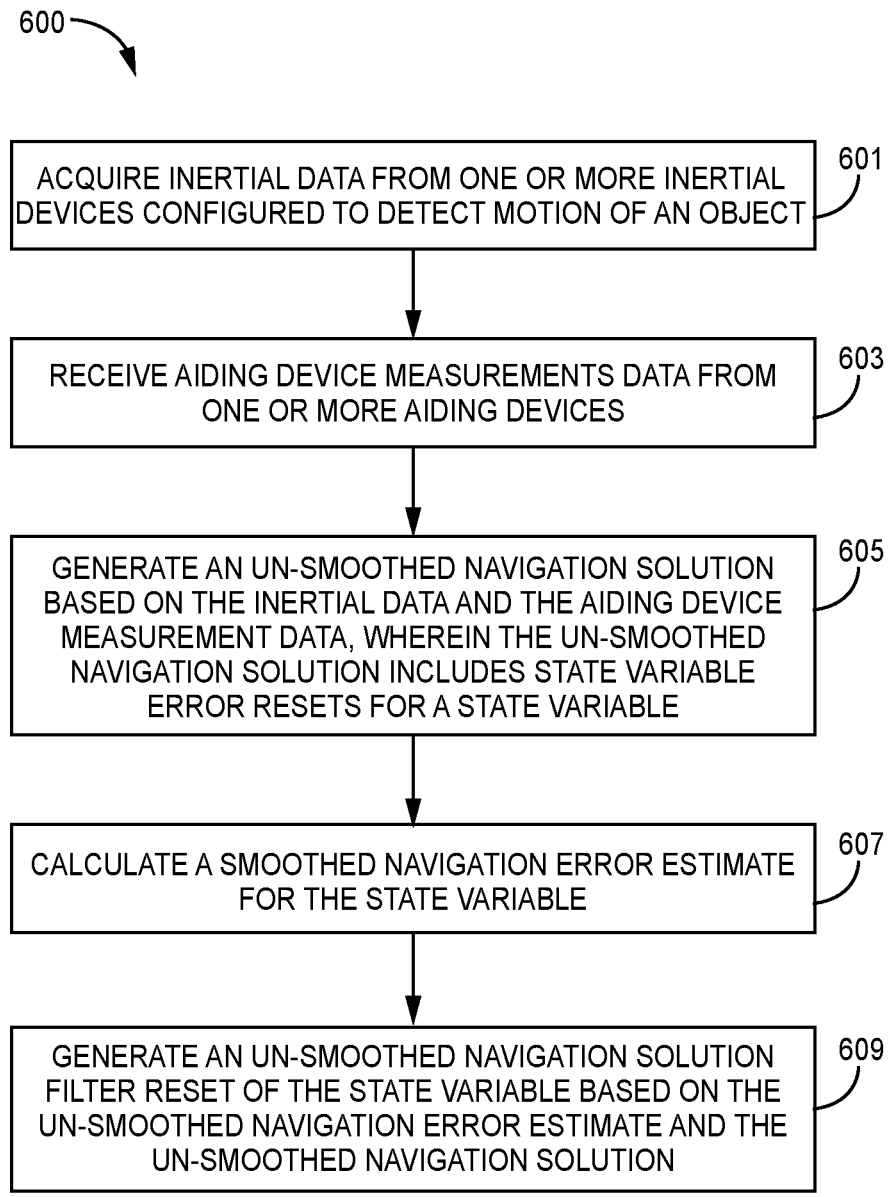
FIG. 6 is a flow diagram depicting an exemplary embodiment of a method according to an aspect of the present disclosure.

FIG. 6 is a flowchart diagram of a method 600 for determining accuracy of smoothed navigation solution using filtered resets. The method 600 proceeds at 601, where inertial data is acquired from one or more inertial devices configured to detect motion of an object. Further, the method 600 proceeds at 603, where aiding device measurement data is received from one or more aiding devices. Also, the method 600 proceeds at 605, where an un-smoothed navigation solution is generated based on the inertial data and the aiding device measurement data, wherein the un-smoothed navigation solution includes state variable error resets for a state variable. Moreover, the method 600 proceeds at 607, where a smoothed navigation error estimate is calculated for the state variable. Additionally, the method 600 proceeds at 609, where an un-smoothed navigation solution filter reset of the state variable is generated based on the un-smoothed navigation error estimate and the un-smoothed navigation solution.

As used in this description, a processing device or unit (such as, but not limited to, the processor 404 that makes part of the computer 402 described above and shown in FIGS. 4A-4C) includes or functions with software programs, firmware, or other computer-readable instructions for carrying out various methods, process tasks, calculations, and control functions, used in any of navigation systems 400A-400C. These instructions are typically stored on any appropriate computer-readable medium (such as, but not limited to, memory 406) used to store computer-readable instructions or data structures. The computer-readable medium can be implemented as any available media accessed by a general-purpose or special-purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE-PROM), and flash memory, etc. Suitable processor-readable media may also include transmission media such as electrical, electromagnetic, or digital signals conveyed via a communication medium such as a network or a wireless link.

EXAMPLE EMBODIMENTS

Example 1 includes a navigation system comprising: one or more inertial devices configured to detect motion of the system and generate inertial data; one or more aiding devices configured to generate aiding device measurement data; and one or more processors configured to generate an un-smoothed navigation solution based on the inertial data and the aiding device measurement data, wherein the un-smoothed navigation solution includes an un-smoothed navigation error estimates for a state variable; wherein the one or more processors are further configured to calculate a smoothed navigation error estimate for the state variable based on the un-smoothed navigation error estimate; and wherein the one or more processors are further configured to determine whether to provide a smoothed filter reset based on the smoothed navigation error estimate and the un-smoothed navigation solution.

Example 2 includes the navigation system of Example 1, wherein the one or more processors are further configured to sum the smoothed filter reset for the state variable into a cumulative sum of smoothed filter resets for the state variable.

Example 3 includes the navigation system of any of Examples 1-2, wherein the one or more processors are further configured to generate an un-smoothed navigation solution filter reset of the state variable based on the un-smoothed navigation error estimate and the un-smoothed navigation solution.

Example 4 includes the navigation system of Example 3, wherein the one or more processors adjust a Kalman filter based on the smoothed filter reset and the un-smoothed navigation solution filter reset.

Example 5 includes the navigation system of Example 4, wherein the one or more processors adjusts the Kalman filter by: determining that the Kalman filter is in an invalid operating state; and re-initializing operation of the Kalman filter.

Example 6 includes the navigation system of any of Examples 1-5, wherein the one or more processors provides the smoothed filter reset based on a comparison of the smoothed navigation error estimate against a threshold.

Example 7 includes the navigation system of any of Examples 1-6, wherein the one or more processors calculates the un-smoothed navigation error estimate as a standard deviation for the state variable.

Example 8 includes the navigation system of any of Examples 1-7, wherein the one or more processors apply a low pass filter to the un-smoothed navigation error estimate to calculate the smoothed navigation error estimate.

Example 9 includes the navigation system of any of Examples 1-8, wherein the one or more processors adjust un-smoothed navigation error estimate according to a scheduled gain approach.

Example 10 includes the navigation system of any of Examples 1-9, wherein the state variable is at least one of a: a velocity state; an altitude state; a latitude/longitude state; and an attitude state.

Example 11 includes a method comprising: acquiring inertial data from one or more inertial devices configured to detect motion of an object; receiving aiding device measurement data from one or more aiding devices; generating an un-smoothed navigation solution based on the inertial data and the aiding device measurement data, wherein the un-smoothed navigation solution includes an un-smoothed navigation error estimate for a state variable; calculating a smoothed navigation error estimate for the state variable; and generating an un-smoothed navigation solution filter reset of the state variable based on the un-smoothed navigation error estimate and the un-smoothed navigation solution.

Example 12 includes the method of Example 11, further comprising determining whether to provide a smoothed filter reset based on the smoothed navigation error estimate and the un-smoothed navigation solution.

Example 13 includes the method of Example 12, further comprising summing the smoothed filter reset for the state variable into a cumulative sum of smoothed filter resets for the state variable.

Example 14 includes the method of any of Examples 11-13, further comprising adjusting a Kalman filter based on the smoothed filter reset and the un-smoothed navigation solution filter reset.

Example 15 includes the method of Example 14, wherein adjusting the Kalman filter further comprises: determining that the Kalman filter is in an invalid operating state; and re-initializing operation of the Kalman filter.

Example 16 includes the method of any of Examples 11-15, further comprising providing a smoothed filter reset based on a comparison of the smoothed navigation error estimate against a threshold.

Example 17 includes the method of any of Examples 11-16, wherein calculating the un-smoothed navigation error estimate is calculated as a standard deviation for the state variable.

Example 18 includes the method of any of Examples 11-17, wherein calculating the smoothed navigation error estimate comprises applying a low pass filter to the un-smoothed navigation error estimate.

Example 19 includes the method of any of Examples 11-18, further comprising adjusting the un-smoothed navigation error estimate according to a scheduled gain approach.

Example 20 includes a navigation system comprising: at least one inertial device configured to detect motion of the system and generate inertial data; at least one aiding device configured to generate aiding device measurement data; and at least one processor configured to generate an un-smoothed navigation solution based on the inertial data and the aiding device measurement data, the un-smoothed navigation solution inclusive of an un-smoothed navigation error resets for a state variable; wherein the at least one processor is further configured to calculate an error estimate for the state variable; wherein the at least one processor is further configured to determine whether to provide a smoothed filter reset based on the un-smoothed navigation error estimate and the un-smoothed navigation solution; wherein the at least one processor is further configured to sum the smoothed filter reset for the state variable into a cumulative sum of smoothed filter resets for the state variable; wherein the at least one processor is further configured to generate an un-smoothed navigation solution filter reset of the state variable based on the un-smoothed navigation error estimate and the un-smoothed navigation solution; and wherein the at least one processor adjusts a Kalman filter based on the smoothed filter reset and the un-smoothed navigation solution filter reset.

Well-known functions or constructions may not be described in detail for brevity or clarity. As used herein, the expression "or" is intended to be used inclusively unless otherwise stated, either explicitly or contextually. The terminology used herein is for the purpose of describing particular embodiments only and is not intended to be limiting of the invention. As used herein, the singular forms "a," "an," and "the" are intended to include the plural forms as well, unless the context clearly indicates or if it is explicitly stated otherwise. It will be further understood that the terms "comprises," "comprising," "includes," or "including," when used in this specification, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a consistent meaning in the context of the relevant art and will not be interpreted in an idealized or overly formal sense unless expressly so defined herein.

What is claimed is:

1. A navigation system comprising:
   one or more inertial devices configured to detect motion of the system and generate inertial data;
   one or more aiding devices configured to generate aiding device measurement data; and
   one or more processors configured to generate an un-smoothed navigation solution based on the inertial data and the aiding device measurement data, wherein the un-smoothed navigation solution includes an un-smoothed navigation error estimates for a state variable;
   wherein the one or more processors are further configured to calculate a smoothed navigation error estimate for the state variable based on the un-smoothed navigation error estimate; and
   wherein the one or more processors are further configured to determine whether to provide a smoothed filter reset based on the smoothed navigation error estimate and the un-smoothed navigation solution.

2. The navigation system of claim 1, wherein the one or more processors are further configured to sum the smoothed filter reset for the state variable into a cumulative sum of smoothed filter resets for the state variable.

3. The navigation system of claim 1, wherein the one or more processors are further configured to generate an un-smoothed navigation solution filter reset of the state variable based on the un-smoothed navigation error estimate and the un-smoothed navigation solution.

4. The navigation system of claim 3, wherein the one or more processors adjust a Kalman filter based on the smoothed filter reset and the un-smoothed navigation solution filter reset.

5. The navigation system of claim 4, wherein the one or more processors adjusts the Kalman filter by:
   determining that the Kalman filter is in an invalid operating state; and
   re-initializing operation of the Kalman filter.

6. The navigation system of claim 1, wherein the one or more processors provides the smoothed filter reset based on a comparison of the smoothed navigation error estimate against a threshold.

7. The navigation system of claim 1, wherein the one or more processors calculates the un-smoothed navigation error estimate as a standard deviation for the state variable.

8. The navigation system of claim 1, wherein the one or more processors apply a low pass filter to the un-smoothed navigation error estimate to calculate the smoothed navigation error estimate.

9. The navigation system of claim 1, wherein the one or more processors adjust un-smoothed navigation error estimate according to a scheduled gain approach.

10. The navigation system of claim 1, wherein the state variable is at least one of a:
    a velocity state;
    an altitude state;
    a latitude/longitude state; and
    an attitude state.

11. A method comprising:
    acquiring inertial data from one or more inertial devices configured to detect motion of an object;
    receiving aiding device measurement data from one or more aiding devices;
    generating an un-smoothed navigation solution based on the inertial data and the aiding device measurement data, wherein the un-smoothed navigation solution includes an un-smoothed navigation error estimate for a state variable;
    calculating a smoothed navigation error estimate for the state variable; and
    generating an un-smoothed navigation solution filter reset of the state variable based on the un-smoothed navigation error estimate and the un-smoothed navigation solution.

12. The method of claim 11, further comprising determining whether to provide a smoothed filter reset based on the smoothed navigation error estimate and the un-smoothed navigation solution.

13. The method of claim 12, further comprising summing the smoothed filter reset for the state variable into a cumulative sum of smoothed filter resets for the state variable.

14. The method of claim 11, further comprising adjusting a Kalman filter based on the smoothed filter reset and the un-smoothed navigation solution filter reset.

15. The method of claim 14, wherein adjusting the Kalman filter further comprises:
    determining that the Kalman filter is in an invalid operating state; and
    re-initializing operation of the Kalman filter.

16. The method of claim 11, further comprising providing a smoothed filter reset based on a comparison of the smoothed navigation error estimate against a threshold.

17. The method of claim 11, wherein calculating the un-smoothed navigation error estimate is calculated as a standard deviation for the state variable.

18. The method of claim 11, wherein calculating the smoothed navigation error estimate comprises applying a low pass filter to the un-smoothed navigation error estimate.

19. The method of claim 11, further comprising adjusting the un-smoothed navigation error estimate according to a scheduled gain approach.

20. A navigation system comprising:
    at least one inertial device configured to detect motion of the system and generate inertial data;
    at least one aiding device configured to generate aiding device measurement data; and
    at least one processor configured to generate an un-smoothed navigation solution based on the inertial data and the aiding device measurement data, the un-smoothed navigation solution inclusive of an un-smoothed navigation error resets for a state variable;
    wherein the at least one processor is further configured to calculate an error estimate for the state variable;
    wherein the at least one processor is further configured to determine whether to provide a smoothed filter reset based on the un-smoothed navigation error estimate and the un-smoothed navigation solution;
    wherein the at least one processor is further configured to sum the smoothed filter reset for the state variable into a cumulative sum of smoothed filter resets for the state variable;
    wherein the at least one processor is further configured to generate an un-smoothed navigation solution filter reset of the state variable based on the un-smoothed navigation error estimate and the un-smoothed navigation solution; and
    wherein the at least one processor adjusts a Kalman filter based on the smoothed filter reset and the un-smoothed navigation solution filter reset.

* * * * *